(12) United States Patent
Mizoguchi et al.

(10) Patent No.: US 11,245,810 B2
(45) Date of Patent: Feb. 8, 2022

(54) IMAGE PROCESSING APPARATUS, METHOD, AND PROGRAM PRODUCT FOR EMBEDDING CORRESPONDING INFORMATION IN AN AREA OVERLAPPING A RECOGNIZED OBJECT

(71) Applicant: CANON KABUSHIKI KAISHA, Tokyo (JP)

(72) Inventors: Yoshinori Mizoguchi, Tokyo (JP); Hiroaki Ogawa, Kanagawa (JP); Fumitaka Goto, Tokyo (JP); Hiroyuki Sakai, Kanagawa (JP); Hiromitsu Yamaguchi, Kanagawa (JP); Tsukasa Doi, Tokyo (JP); Takeru Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/111,054

(22) Filed: Dec. 3, 2020

(65) Prior Publication Data
US 2021/0176376 A1 Jun. 10, 2021

(30) Foreign Application Priority Data
Dec. 9, 2019 (JP) .............................. JP2019-222001

(51) Int. Cl.
*H04N 1/32* (2006.01)
*H04N 1/387* (2006.01)

(52) U.S. Cl.
CPC ..... *H04N 1/32352* (2013.01); *H04N 1/32219* (2013.01); *H04N 1/32229* (2013.01); *H04N 1/3871* (2013.01); *H04N 2201/3225* (2013.01)

(58) Field of Classification Search
CPC ............. H04N 1/00411; H04N 1/0044; H04N 1/00442; H04N 1/32144; H04N 1/32149; H04N 1/32208; H04N 1/32219; H04N 1/32229; H04N 1/32352; H04N 1/387–1/3878; H04N 2201/3225; H04N 2201/3226; H04N 2201/3228; G06K 15/1882; G06K 15/1885; G06K 15/1889;
(Continued)

(56) References Cited

U.S. PATENT DOCUMENTS

| 7,388,606 | B2 * | 6/2008 | Fox ..................... H04N 1/32101 348/231.3 |
| 10,482,327 | B1 * | 11/2019 | Ouimet ................... G06T 11/60 |
| 2008/0152197 | A1 * | 6/2008 | Kawada ............... H04N 1/2112 382/115 |

FOREIGN PATENT DOCUMENTS

JP        5541360 B2    7/2014

* cited by examiner

*Primary Examiner* — Scott A Rogers
(74) *Attorney, Agent, or Firm* — Canon U.S.A., Inc. IP Division

(57) ABSTRACT

An object of the present disclosure is to reduce the load of a user in a case where multiplexed information is embedded in an image. One embodiment of the present invention is an image processing apparatus having: a recognition unit configured to recognize an object within an image; a selection unit configured to select additional information corresponding to an object recognized by the recognition unit from among additional information stored in a storage unit; and a layout unit configured to lay out the additional information so that at least a part of an area in which additional information selected by the selection unit is embedded overlaps an area of an object recognized by the recognition unit.

19 Claims, 19 Drawing Sheets

(58) Field of Classification Search
CPC .... G06K 3/1208; G06K 3/125; G06K 3/1242; G06K 3/1243
See application file for complete search history.

| 0 | 0 | 0 | -1 | -1 |
|---|---|---|---|---|
| 0 | -1 | -1 | 2 | 2 |
| -1 | 2 | 2 | -1 | -1 |
| 2 | -1 | -1 | 0 | 0 |
| -1 | 0 | 0 | 0 | 0 |

FIG.6A

| 0 | 0 | -1 | 2 | -1 |
|---|---|---|---|---|
| 0 | 0 | -1 | 2 | -1 |
| 0 | -1 | 2 | -1 | 0 |
| 0 | -1 | 2 | -1 | 0 |
| -1 | 2 | -1 | 0 | 0 |

FIG.6B

| Object No | Feature cluster |
|---|---|
| $I_1$ | $F_1$ |
| $I_2$ | $F_2$ |
| $I_3$ | $F_3$ |

| Multiplexed information No | Multiplexed contents |
|---|---|
| $B_1$ | "hello" |
| $B_2$ | "bye" |
| $B_3$ | "lunch" |

| Association No | Multiplexed information No | Object No |
|---|---|---|
| $S_1$ | $B_1$ | $I_3$ |
| $S_2$ | $B_2$ | $I_1$ |
| $S_3$ | $B_3$ | $I_2$ |

| Object No | Feature cluster |
|---|---|
| $I_1$ | $F_1$ |
| $I_2$ | $F_2$ |
| $I_3$ | $F_3$ |
| ... | ... |
| $I_N$ | $F_N$ |

FIG.16A

| Additional information No | Multiplexed contents |
|---|---|
| $B_1$ | "hello" |
| $B_2$ | "bye" |
| $B_3$ | "lunch" |
| ... | ... |
| $B_M$ | "pool" |

FIG.16B

| Association No | Multiplexed information No | Object No | Number of objects | Object size | Object position |
|---|---|---|---|---|---|
| $S_1$ | $B_1$ | $I_3$ | - | - | $Y \geq Y\_TH$ |
| $S_2$ | $B_2$ | $I_1$ | - | $Size \geq SIZE\_TH$ | - |
| $S_3$ | $B_3$ | $I_2$ | - | - | - |
| $S_4$ | $B_4$ | $I_3$ | - | - | $Y < Y\_TH$ |
| $S_5$ | $B_5$ | - | - | $Size \geq SIZE\_TH$ | - |
| $S_6$ | $B_2$ | $I_4$ | - | - | - |
| $S_7$ | $B_6$ | $I_5$ | $Num \geq NUM\_TH$ | - | - |
| $S_8$ | $B_7$ | $I_5$ | $Num < NUM\_TH$ | - | - |
| $S_9$ | $B_8$ | $I_1$ | - | $Size < SIZE\_TH$ | - |

FIG.16C

IMAGE PROCESSING APPARATUS, METHOD, AND PROGRAM PRODUCT FOR EMBEDDING CORRESPONDING INFORMATION IN AN AREA OVERLAPPING A RECOGNIZED OBJECT

BACKGROUND OF THE INVENTION

Field of the Invention

The present disclosure relates to a technique for embedding information in an image.

Description of the Related Art

Conventionally, there is a multiplexing technique capable of printing additional information (hereinafter, described as multiplexed information), such as a character string, including not only an image in a state near to an invisible state by encoding the multiplexed information and embedding the encoded multiplexed information in a printing-target image.

Japanese Patent No. 5541360 has described appropriate arrangement of markers indicating the areas in which multiplexed information is embedded as a technique to avoid an overlap between the areas in which multiplexed information is embedded so that a reading side does not make a reading error in a case where a plurality of pieces of multiplexed information is embedded in a printed material.

SUMMARY OF THE INVENTION

However, Japanese Patent No. 5541360 has not taken into consideration a reduction in the load at the time of selecting appropriate multiplexed information and embedding the selected multiplexed information in an image area.

Consequently, in view of the above-described problem, an object of one embodiment of the present invention is to reduce the load of a user at the time of embedding multiplexed information in an image.

One embodiment of the present invention is an image processing apparatus having: a recognition unit configured to recognize an object within an image; a selection unit configured to select additional information corresponding to an object recognized by the recognition unit from among additional information stored in a storage unit; and a layout unit configured to lay out the additional information so that at least a part of an area in which additional information selected by the selection unit is embedded overlaps an area of an object recognized by the recognition unit.

Further features of the present disclosure will become apparent from the following description of exemplary embodiments with reference to the attached drawings.

BRIEF DESCRIPTION OF THE DRAWINGS

FIG. 6A and FIG. 6B are each a diagram showing a pattern obtained by digitizing each of the mask patterns in FIG. 4A and FIG. 4B;

FIG. 16A to FIG. 16C are diagrams for explaining a relationship between a DB relating to object information and multiplexed information, and a DB relating to association in a second embodiment;

DESCRIPTION OF THE EMBODIMENTS

In the following, embodiments of the present disclosure are explained based on the drawings.

First Embodiment

The present embodiment relates to a multiplexing encoding processing unit configured to embed multiplexed information in image information, but here, explanation is given with a multiplexing decoding processing unit configured to extract multiplexed information from a captured image being included. Further, in the following, explanation is given by dividing the configuration into the basic configuration of an information processing system and the characteristic configuration of the information processing system.

(1) Basic Configuration (1-1) Hardware of Multiplexing Encoding Processing Unit

Figure 1A:
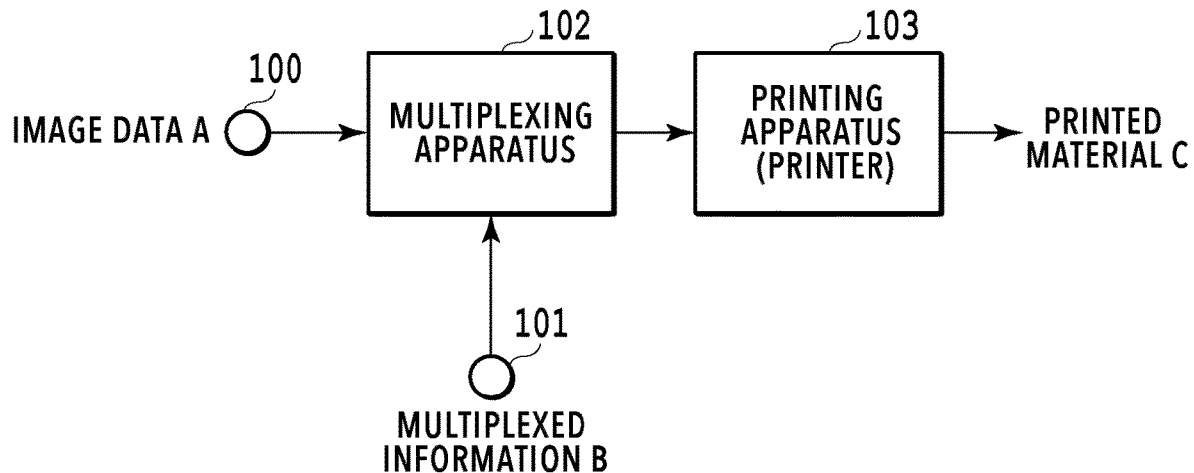
FIG. 1A and FIG. 1B are each a diagram showing a basic configuration of a multiplexing encoding processing unit in a first embodiment.
Figure 1B:
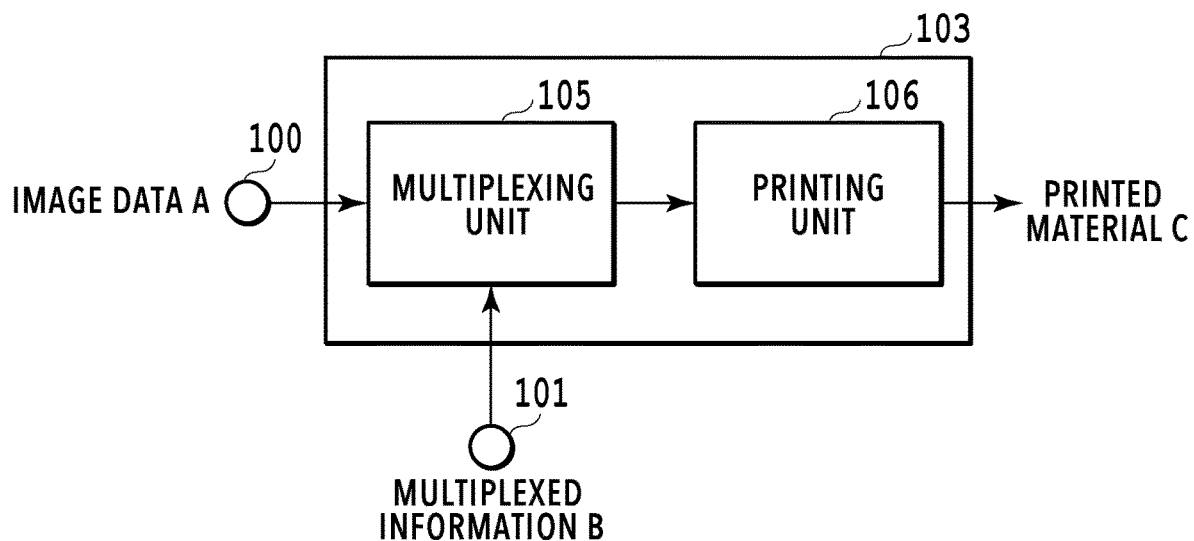

FIG. 1A and FIG. 1B are each a diagram showing a configuration example of hardware (multiplexing encoding processing unit) for multiplexing encoding to embed multiplexed information in image information in the information processing system. Each of these pieces of hardware acquires image data (also referred to as image information) A and multiplexing-target data (referred to as multiplexed information, multiplexed data, additional information and the like) B that is embedded in the image data, and generates a printed material C in which the image data A and the multiplexed information B are embedded. The hardware in FIG. 1A is configured so as to perform processing to embed the multiplexed information B in the image data A by an apparatus separate from a printing apparatus (printer). The hardware in FIG. 1B is configured so as to perform processing to embed the multiplexed information B in the image data A within the printing apparatus.

In the configuration in FIG. 1A, the image data A that is input from an input terminal 100 is multi-tone image data including color components. In contrast to this, the multiplexed information B that is input from an input terminal 101 is text document data, voice data, moving image data and the like. Alternatively, the multiplexed information B may be data obtained by compressing text document data, voice data, image data, moving image data and the like, or may be another piece of data having been converted into a binary value. A multiplexing apparatus 102 that multiplexes information performs processing (referred to as multiplexing processing, embedding processing and the like) to embed the multiplexed information B in the image data A, as will be described later. A printing apparatus 103 generates the printed material C by performing a printing operation based on the image data A in which the multiplexed information B is embedded.

In the configuration in FIG. 1B, a multiplexing unit 105 corresponding to the multiplexing apparatus 102 in FIG. 1A is included in the printing apparatus 103. As in the configuration in FIG. 1A, the image data A is input from the input terminal 100 and the multiplexed information B is input from the input terminal 101. The multiplexing unit 105 within the printing apparatus 103 performs processing to embed the multiplexed information B in the image data A. Further, a printing unit 106 within the printing apparatus 103 generates the printed material C by performing the printing operation based on the image data A in which the multiplexed information B is embedded. The processing to generate the printed material C based on the image data A in which the multiplexed information B is embedded as described above is also referred to as "multiplexing encoding processing".

Figure 2:
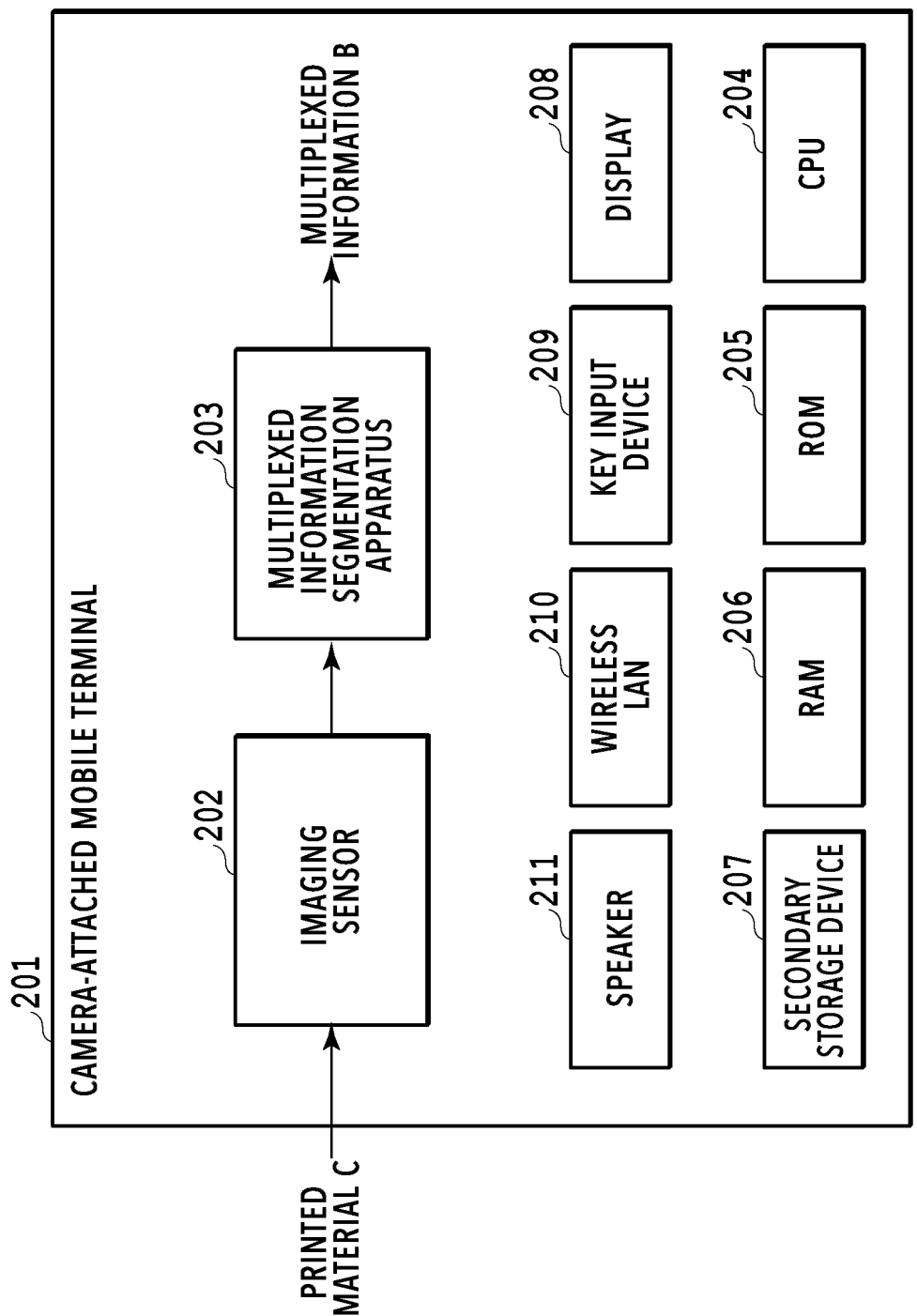
FIG. 2 is a diagram showing a basic configuration of a multiplexing decoding processing unit in the first embodiment.

FIG. 2 a diagram showing a configuration example of hardware (multiplexing decoding processing unit) for multiplexing decoding to extract the multiplexed information B from the printed material C in the information processing system. This hardware extracts the embedded multiplexed information B by capturing the printed material C generated by the multiplexing encoding processing by an image capturing apparatus, such as a camera, and analyzing the captured image.

A camera-attached mobile terminal (information processing apparatus) 201 has an imaging sensor 202 and has a function to capture the printed material C. As the mobile terminal 201, a smartphone, a PDA or the like is supposed. A multiplexed information segmentation apparatus 203 extracts the multiplexed information B by analyzing an image captured by the imaging sensor 202. A CPU (Central Processing Unit) 204 performs an information processing method in accordance with programs. In a ROM 205, programs that are executed by the CPU 204 are stored. A RAM 206 functions as a memory for temporarily storing various kinds of information at the time of the CPU 204 executing programs. In a secondary storage device 207, such as a hard disk, image files, databases including image analysis results, and the like are stored.

On a display 208, information based on processing results of the CPU 204, and the like are displayed and a user visually recognizes contents displayed on the display 208. A user gives instructions of processing, inputs characters and so on using a key input device 209. It may also be possible to adopt a display comprising a touch panel function that has both the display function of the display 208 and the input function of the key input device 209, in place of the display 208 and the key input device 209.

A wireless LAN 210 is connected to the internet. The mobile terminal 201 causes the display 208 to display a screen of a site and the like by accessing the site connected to the internet. It is possible for the mobile terminal 201 to transmit or receive data via the wireless LAN 210. A speaker 211 outputs a voice in a case where the extracted multiplexed information is voice data or voice-attached moving image data, outputs a voice at the time of reproduction of moving image data in a case where there is moving image data at the connection destination of the internet, and so on.

The mobile terminal 201 is not limited to the configuration that incorporates the imaging sensor 202. For example, the configuration of the mobile terminal 201 may be a configuration in which the imaging sensor 202 is controlled by an apparatus separate from the mobile terminal 201 and the captured image is transmitted to the multiplexed information segmentation apparatus 203. As the imaging sensor 202, it is possible to adopt a digital camera, a video camera and the like. In contrast to the multiplexing encoding processing, the processing to extract the multiplexed information B from the printed material C is also referred to as "multiplexing decoding processing".

(1-2) Firmware Configuration for Multiplexing Encoding Processing

Figure 3:
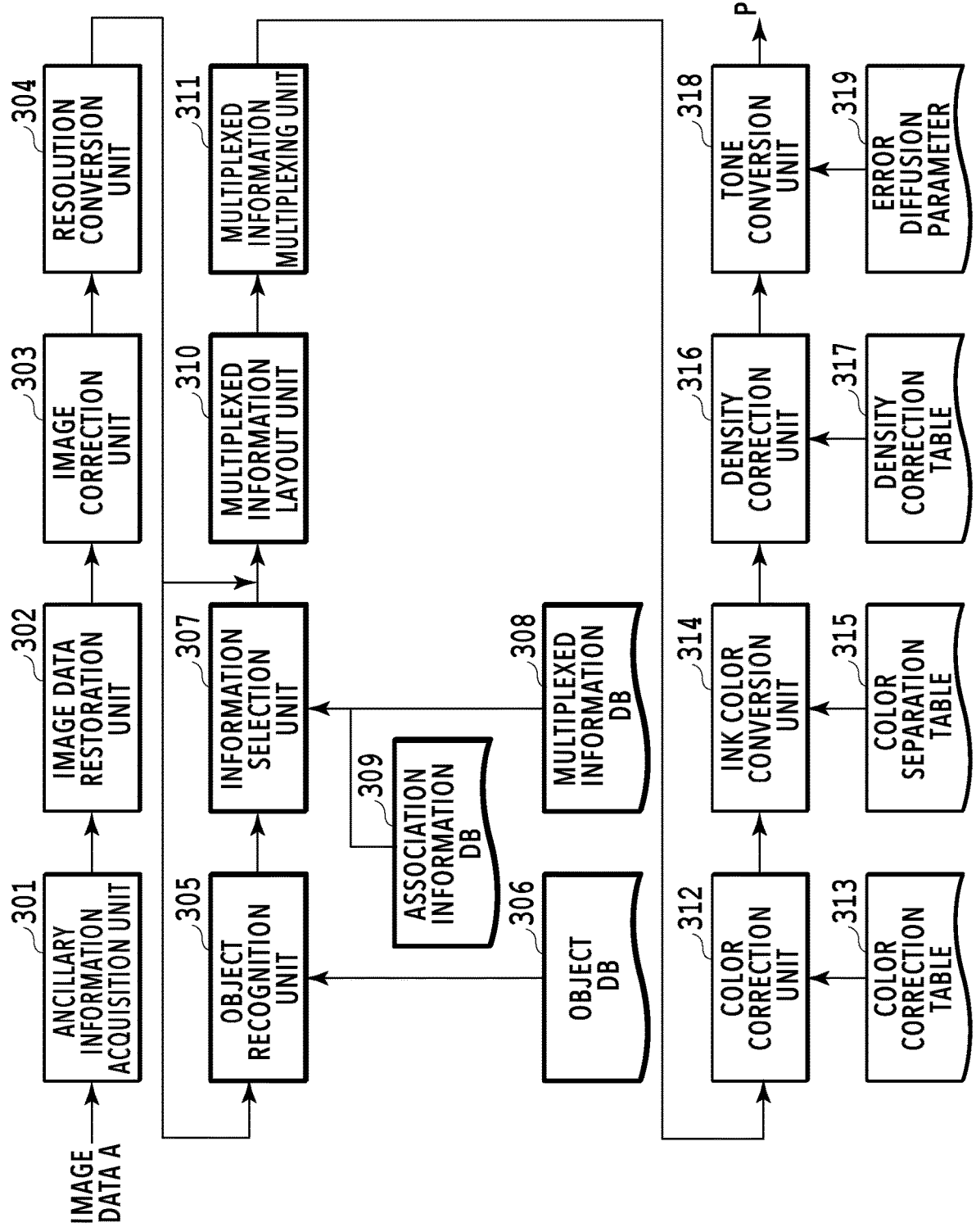
FIG. 3 is a block diagram of a multiplexing encoding processing unit in the first embodiment.

FIG. 3 is block diagram of a basic firmware configuration for multiplexing encoding processing. For image data, the following processing is performed and the image data is converted into data having a resolution and the number of tones that can be received by a printing engine connected to the print head, and then transmitted to the printing engine. In the present embodiment, explanation is given on the assumption that the multiplexing apparatus 102 comprises units 301 to 311 in FIG. 3 and the printing apparatus 103 comprises units 312 to 319, but this is not limited. For example, the printing apparatus 103 may comprise the units 301 to 319 or the multiplexing apparatus 102 may comprise the units 301 to 319.

(1-2-1) Ancillary Information Acquisition Unit

An ancillary information acquisition unit 301 acquires various parameters used at the time of compressing image data. The acquired various parameters are sent to an image data restoration unit 302 and made use of for processing for converting compressed image data into original image data. Further, the acquired various parameters are made use of for processing for calculating a degree of compression. For example, the input image data is irreversible image data obtained by compressing document data in the JPEG format and printed on a printing medium. In the irreversible image data, a quantization table used at the time of compression and an image data size are included. The image data size information and the quantization table, both are acquired, are sent to the image data restoration unit 302.

(1-2-2) Image Data Restoration Unit

The image data restoration unit 302 extracts image data by decoding encoded image data.

(1-2-3) Image Correction Unit

An image correction unit 303 performs image correction processing for RGB data decoded by the image data restoration unit 302. As image correction, mention is made of a variety of kinds of correction, such as backlight correction and red-eye correction on the supposition of printing of a photo, in addition to lightness adjustment to brighten or darken the entire color, contrast adjustment, and color balance adjustment. By performing those kinds of correction in the image correction unit 303 in a centralized manner, it is possible to implement processing that does not depend on a printing apparatus.

(1-2-4) Resolution Conversion Unit

A resolution conversion unit 304 converts image data so that the resolution of the image data is a resolution compatible with the printing apparatus. In detail, the resolution conversion unit 304 performs enlargement or reduction processing based on a scaling amount derived in accordance with image data to be input and the resolution of the printing apparatus. As the method of scaling processing, the nearest neighbor method, the bilinear method, the bicubic method, and the like exist and it is sufficient to select an appropriate method by taking into consideration the processing characteristic and the processing speed.

(1-2-5) Object Recognition Unit

An object recognition unit 305 performs object recognition processing for image data. In FIG. 3, the object recognition is performed for the image obtained by performing the image correction and the resolution conversion for the image data A, but the present embodiment is not limited to this configuration. It may also be possible to appropriately transform the image for which the object recognition is performed in accordance with the contents of the recognition processing, the required speed of the entire processing and the like.

As the technique relating to the object recognition, for example, there is a face recognition technique. As a flow of processing of face recognition, first, an area that appears to be a face in an image is specified and a feature quantity of the specified area that appears to be a face is derived. This feature quantity is calculated in accordance with a certain calculation formula and for example, acquisition of a histogram of the specified area, acquisition of amplitude and phase information, which is the results of performing frequency conversion, and the like are also included in the category of the feature quantity calculation. For a plurality of pieces of face information, a feature quantity map is created in advance for each different person. In the field of the face recognition technique, the image data used for creation of the feature quantity map or mapped data is called "training (data)". An object DB 306 is a database storing the training data. Based on the feature quantity derived for the area that appears to be a face in the image, which person mapped in the feature quantity map, the person within the area resembles is determined. The above is the processing contents of the general face recognition technique.

Figures 12A, 12B, 12C, 12D:
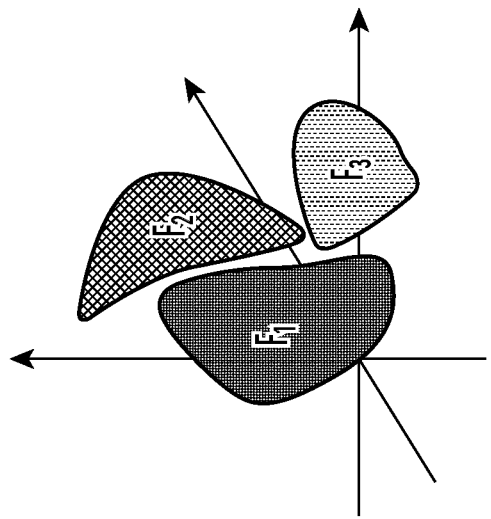
FIG. 12A to FIG. 12D are diagrams for explaining a relationship between a DB relating to object information and multiplexed information, and a DB relating to association in the first embodiment.

FIG. 12A shows a database of stored training data in a case where object recognition is performed. That is, FIG. 12A shows an example of the object DB 306. As shown in FIG. 12A, a value $I_1$ of Object No indicating the kind of object corresponds to a Feature cluster value $F_1$ and similarly, $I_2$ corresponds to $F_2$ and $I_3$ corresponds to $F_3$.

FIG. 12B is a conceptual diagram of a training data map. In FIG. 12B, the Feature cluster values $F_1$ to $F_3$ are mapped in a three-dimensional map. The object recognition unit 305 derives a feature quantity of an object within an image and based on the derived feature quantity, determines to which of the Feature cluster values $F_1$ to $F_3$ within the three-dimensional map the object corresponds. The cluster described here indicates a range in which it is determined that the object is the relevant object in the map. One point corresponding to a derived feature quantity group is plotted on the basis of the axis of the map and based on whether or not the plotted position is included in the cluster, whether or not the object is the object of the relevant cluster is determined. In a case where it is desired to distinguish information having a complicated feature or in a case where the number of kinds of object desired to be distinguished is large, there is a tendency for the number of axes of the map to increase. Further, it is desirable for the range that a Feature cluster value $F_n$ can take to be a range whose accuracy has been improved by mapping features of objects in the order of several hundred to several thousand for each Feature cluster value. Further, there is also a case where a plurality of objects is recognized from the image data A.

(1-2-6) Information Selection Unit

An information selection unit 307 selects optimum multiplexed information from a multiplexed information DB 308 in accordance with the object recognized by the object recognition unit 305. The multiplexed information stored in the multiplexed information DB 308 may become the multiplexed information B that is embedded in the image data A in the multiplexing apparatus 102 in FIG. 1A or in the multiplexing unit 105 in FIG. 1B. The processing by the information selection unit 307 corresponds to the processing to select the multiplexed information B that is embedded in the image data A.

In multiplexed information, text document data and the like are included. The text document data is, for example, numerical value data in which a figure or a character is allocated to a numerical value by making use of a character code already known publicly. The numerical value data such as this is stored in the multiplexed information DB 308 as multiplexed information.

As a specific example, text document data corresponding to characters of "hello" is explained. It is assumed that the text document data is numerical value data, that is, so-called binary data. The binary data is information represented by "0" and "1" and a continuous combination of "0" and "1" has a specific meaning. The correspondence between binary data and a character is defined by the "character code". In a case of "Shift JIS", which is one of the character codes, "h" corresponds to "01101000" of binary data. Similarly, "e" corresponds to binary data of "01100101", "1" corresponds to that of "01101100", and "o" corresponds to that of "01101111". Consequently, according to the binary data, the characters "hello" can be represented as "0110100001100101011011000110110001101111". Conversely, in a case where it is possible to acquire binary data of "0110100001100101011011000110110001101111", it is possible to acquire the characters "hello" based on the acquired binary data. The multiplexed information DB 308 corresponds to the numerical value data converted into the binary data such as this.

FIG. 12C shows an example of the multiplexed information DB 308. In the table in FIG. 12C, the characters "hello", "bye", and "lunch" desired to be embedded as the multiplexed information are stored. These characters respectively correspond to the values (in this example, one of $B_1$ to $B_3$) of Multiplexed information No for identifying characters.

The information selection unit 307 refers to an association information DB 309. In the association information DB 309, information for associating the recognized object and the contents stored in the multiplexed information DB 308 with each other is stored.

FIG. 12D shows a database for associating the database in FIG. 12A and the database in FIG. 12C with each other as a specific example of the association information DB 309. In FIG. 12D, a value $S_1$ of Association No, which is association information, is associated with the correspondence between $B_1$ and $I_3$, $S_2$ is associated with the correspondence between $B_2$ and $I_1$, and $S_3$ is associated with the correspondence between $B_3$ and $I_2$. It is possible for the information selection unit 307 to select multiplexed information optimum for the object in the image by referring to the multiplexed information DB 308 by using the association information. In the following, selecting multiplexed information (referred to information selection processing) optimum for the object in the image, which is performed by the information selection unit 307, is explained by using FIG. 13.

Figure 13:
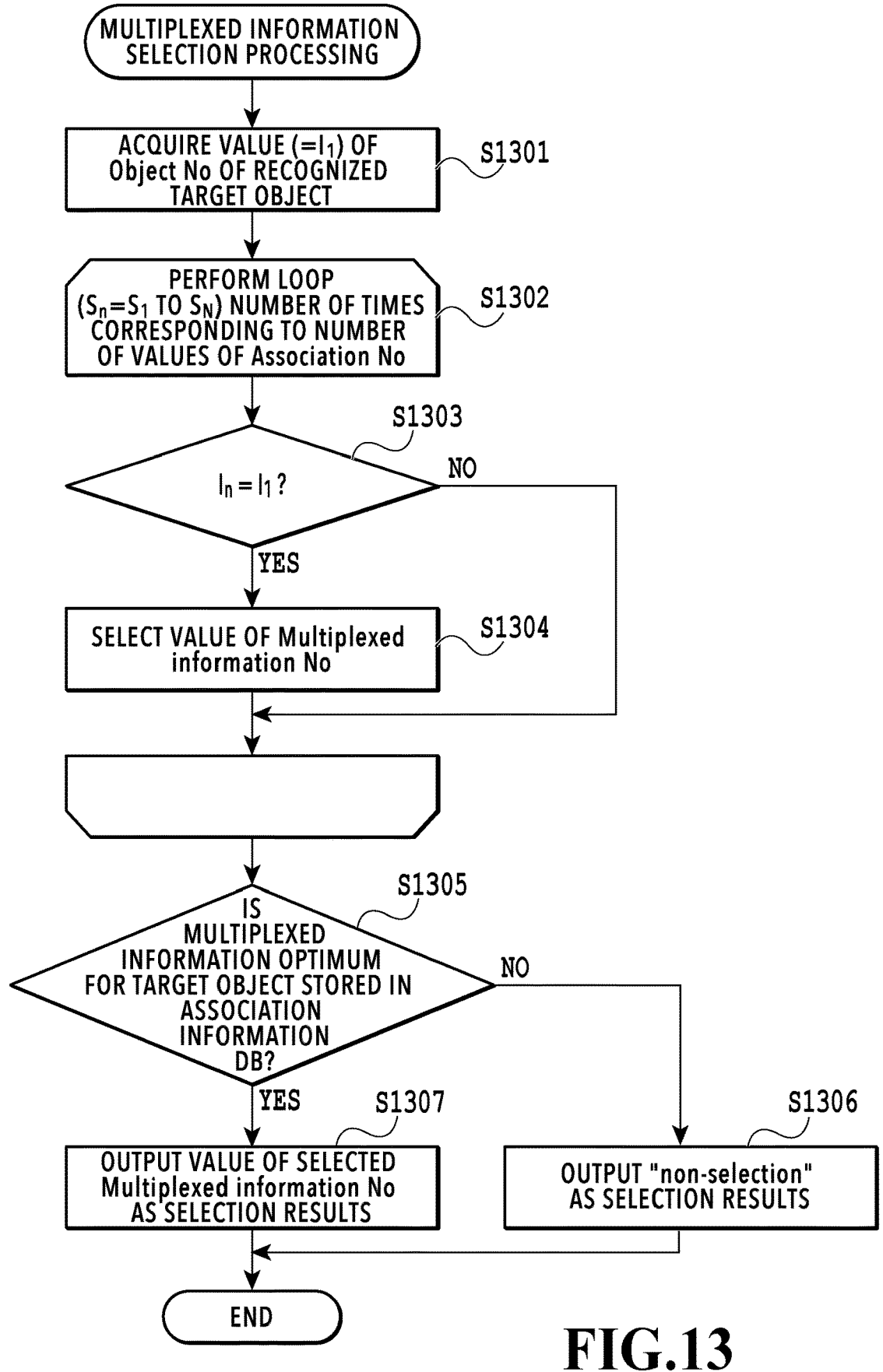
FIG. 13 is a flowchart of information selection processing in the first embodiment.

FIG. 13 is a flowchart of information selection processing in the present embodiment and shows a procedure to select multiplexed information for the object recognized by the object recognition unit 305 for each step. In the following, explanation is given by taking a case as a specific example where the value of Object No for the recognized object is $I_1$. In a case where a plurality of objects is recognized in the image, the processing of the same flow is performed for each of the plurality of recognized objects. In the present embodiment, the processing at each step is performed by the CPU of the multiplexing apparatus 102 (or the printing apparatus 103) reading a program relating to the flowchart and executing the program.

At S1301, the information selection unit 307 acquires the value of Object No corresponding to the target object recognized by the object recognition unit 305. In FIG. 12A, as the values of Object No, $I_1$ to $I_3$ exist, but in the following, explanation is given by supposing a case where the value of Object No corresponding to the target object is $I_1$. That is, the object recognition unit 305 outputs the feature quantity "$F_1$" extracted from the object within the image to the information selection unit 307. Then, the information selection unit 307 acquires "$I_1$" as the value of Object No based on the feature quantity "$F_1$" and the object DB 306. In the following, "step S–" is abbreviated to "S–".

At S1302, the information selection unit 307 performs loop processing at S1303 to S1304 the number of times at the maximum, which corresponds to the number of values of Association No (assumed to be N) stored in the association information DB 309 (for example, FIG. 12D). For example, in a case where the table in FIG. 12D is used, as the values of Association No, $S_1$ to $S_3$ are stored, and therefore, the repeated processing is performed three times at the maximum. The loop processing at S1303 to S1304 is terminated at the point in time at which the value of Multiplexed information No corresponding to the value of Object No acquired at S1301 is found and the processing advances to S1305.

At S1303, the information selection unit 307 determines whether the value of Object No that coincides with the value (in this example, $I_1$) of Object No acquired at S1301 is stored in the row of Association No of interest by referring to the association information DB 309 (for example, FIG. 12D). In a case where the determination results at this step are affirmative, the processing advances to S1304 and on the other hand, in a case where the determination results are negative, the processing advances to the next loop processing (S1303 to S1304).

At S1304, the information selection unit 307 selects the value of Multiplexed information No associated with the value of Object No of the recognized target object by referring to the association information DB 309 (for example, FIG. 12D). Specifically, the information selection unit 307 selectively determines the value of Multiplexed information No associated with the value of Object No acquired at S1301 as the value of Multiplexed information No for identifying the contents of the information to be attached to the target object. In a case where the value of Object No acquired at S1301 is $I_1$ and the table in FIG. 12D is used, at this step, $B_2$ is selected as the value of Multiplexed information No.

At S1305, the information selection unit 307 determines whether the multiplexed information optimum for the target object recognized by the object recognition unit 305 is stored in the association information DB 309. In a case where the determination results at this step are affirmative, the processing advances to S1307 and on the other hand, in a case where the determination results are negative, the processing advances to S1306. In the specific example of the present embodiment, as the value of Multiplexed information No, $B_2$ is selected at S1304, and therefore, the determination results at S1305 are affirmative.

At S1306, the information selection unit 307 outputs a value indicating that multiplexed information is not selected (value indicating "non-selection") because the multiplexed information optimum for the target object is not stored in the association information DB 309. Then, the CPU of the image processing apparatus acquires the output value.

At S1307, the information selection unit 307 outputs the value of Multiplexed information No (in the present embodiment, "$B_2$") selected at S1304 and the CPU of the image processing apparatus acquires the output value.

The above is the contents of the information selection processing. By performing the processing of the flowchart in FIG. 13, the multiplexed information corresponding to the kind of recognized object (Object No) is selected automatically, and therefore, the operability improves.

(1-2-7) Multiplexed Information Layout Unit

A multiplexed information layout unit 310 performs processing (referred to as multiplexed information layout processing) to determine at which position in the image the multiplexed information B selected by the information selection unit 307 is laid out. In the following, the multiplexed information layout processing is explained by using FIG. 14.

Figure 14:
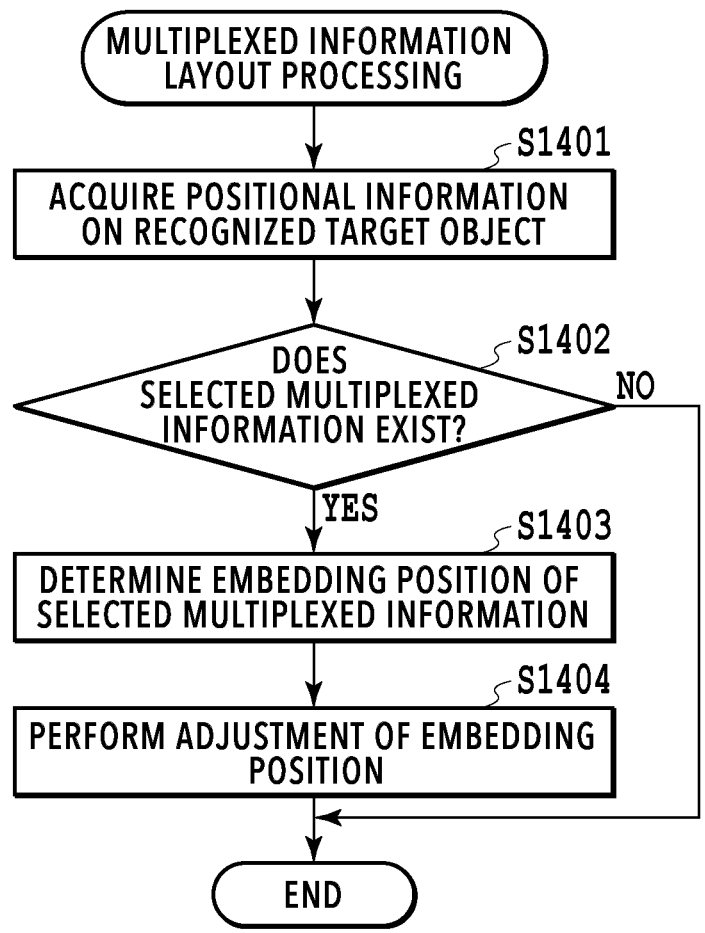
FIG. 14 is a flowchart of multiplexed information layout processing in the first embodiment.

FIG. 14 is a flowchart of the multiplexed information layout processing and shows a procedure to determine the position at which the multiplexed information B selected by the information selection unit 307 is embedded in the image data A for each step.

At S1401, the multiplexed information layout unit 310 acquires the positional information on the target object recognized by the object recognition unit 305. The positional information that is acquired at this step may be the positional information acquired at the time of the object recognition unit 305 performing area specification, or it may also be possible to find the positional information on a specified area by the multiplexed information layout unit 310 specifying anew the area in which the object exists.

At S1402, the multiplexed information layout unit 310 determines whether there is multiplexed information selected for the target object. For example, at S1402, the multiplexed information layout unit 310 performs determination processing based on the information acquired from the information selection unit 307. Specifically, the object recognition unit 305 outputs the feature quantity "$F_1$" extracted from the target object to the information selection unit 307. Then, the information selection unit 307 acquires "$I_1$" as the value of Object No based on the feature quantity "$F_1$" and the object DB 306. Further, the information selection unit 307 outputs the Multiplexed information No value "$B_2$" specified based on the value "$I_1$" of Object No and the association information DB 309 to the multiplexed information layout unit 310. Here, the multiplexed information layout unit 310 determines that the results of the determination are affirmative at S1402 in a case where it is possible to acquire Multiplexed information No. On the other hand, in a case where it is not possible to acquire Multiplexed information No, the multiplexed information layout unit 310 determines that the results of the determination are negative at S1402. In a case where the determination results at this step are affirmative, the processing advances to S1403 and on the other hand, in a case where the determination results are negative, the multiplexed information layout processing is terminated.

At S1403, the multiplexed information layout unit 310 determines the embedding position (also called layout position) of the selected multiplexed information based on the positional information acquired at S1401.

As above, by performing the processing of the flowchart in FIG. 14, the position at which the multiplexed information automatically selected based on the kind of recognized object is embedded is determined automatically, and therefore, the operability improves.

Figure 15A:
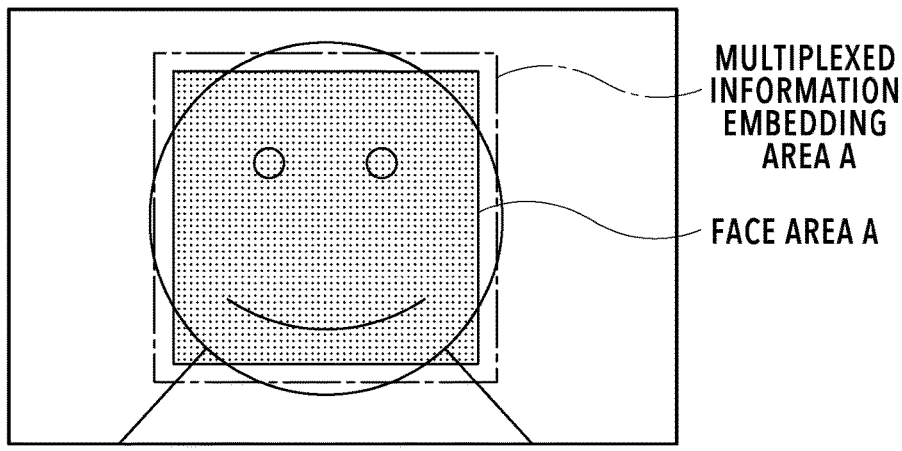
FIG. 15A to FIG. 15C are diagrams for explaining layout processing in the first embodiment.

FIG. 15A shows a determination example of the embedding position of multiplexed information in a case where the multiplexed information layout processing is performed. First, the multiplexed information corresponding to the kind of object of a face area A is selected by the processing in FIG. 13. Then, based on the position of the object specified at S1401, the position of a multiplexed information embedding area that overlaps an object area is specified. In FIG. 15A, in a case where the object to be recognized is taken to be a face, with the center position of the face area A being taken as a reference, a multiplexed information embedding area A is determined. That is, the embedding area A is determined so that the multiplexed information selected automatically based on the recognized object of the face area A overlaps the face area A. In a case where the multiplexed information is embedded at the center position of the object area as described above, it is made possible for a reading-side user to read the multiplexed information with a high accuracy by holding the terminal above the object. Even in a case where the multiplexed information embedding position is shifted from the center position of the object area, on a condition that the object area is located within the visual field range of the terminal that is held above by the reading-side user, it is possible to read the related multiplexed information. In a case where even a part of the multiplexed information overlaps the position of the object, the possibility that the object area in which multiplexed information is embedded deviates from the visual field range at the time of reading is faint.

Figure 15B:
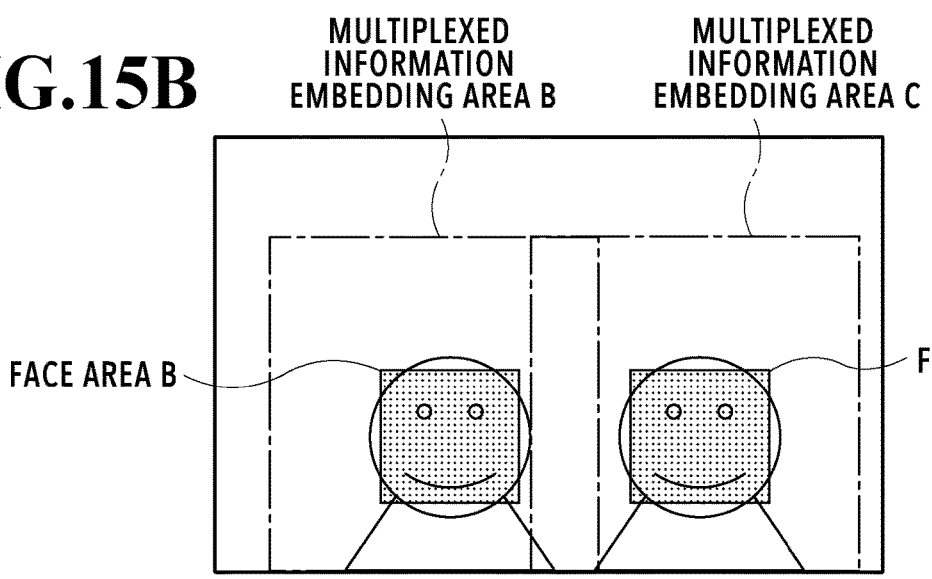

At S1404, the multiplexed information layout unit 310 performs adjustment of the embedding position. For example, the adjustment of the embedding position is performed for the image as in FIG. 15B. In FIG. 15B, two persons are captured and it is assumed that a multiplexed information embedding area B and a multiplexed information embedding area C are determined at S1403 as a result of performing the object recognition on each person and laying out multiplexed information. In a case where a plurality of pieces of information to be embedded overlaps as shown schematically, an error will occur at the time of decoding the read data. Consequently, in a case where embedding positions overlap, adjustment is performed so as to prevent an overlap.

Figure 15C:
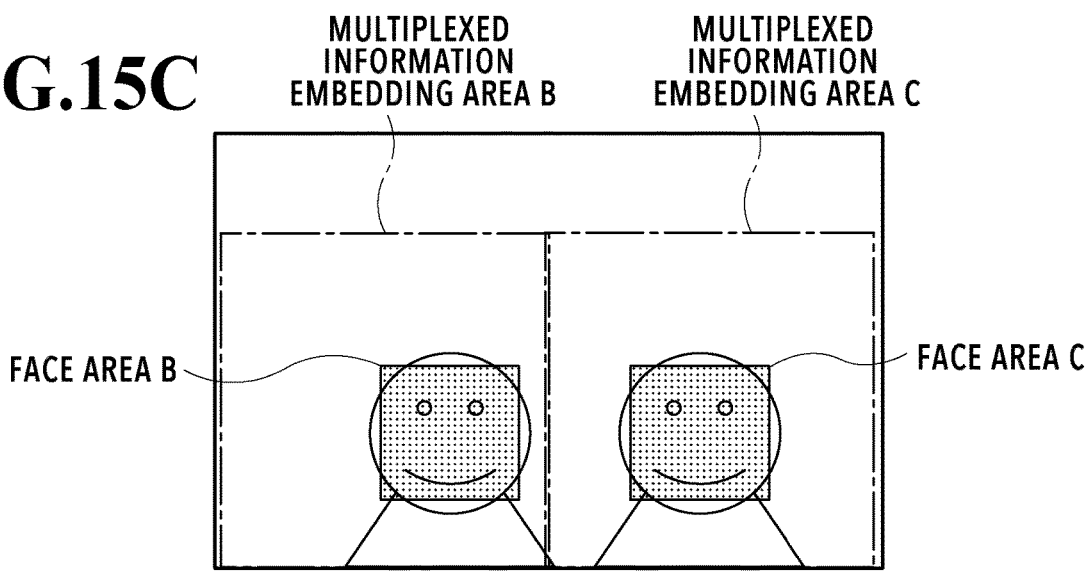

FIG. 15C shows the results of performing the position adjustment so as to prevent an overlap. Each of the positions of the multiplexed information embedding area B and the multiplexed information embedding area C is moved so that both areas do not overlap. In the present embodiment, as an example of the method of preventing an overlap, the multiplexed information layout unit 310 slides the different multiplexed information embedding areas in the directions opposite to each other on the X-axis so as to prevent an overlap. However, the adjustment method of the embedding position is not limited to this. As a method other than this, for example, it may also be possible to adopt a method of adjusting the position so that the ratio in which the object area associated with the multiplexed information overlaps the multiplexed information becomes high compared to the ratio in which the multiplexed information overlaps the object area not associated with the multiplexed information. It may also be possible to eliminate the overlap of the embedding positions by adjusting the sizes of the embedding areas.

Further, in the present embodiment, although not limited in particular, a mechanism is provided that enables a reading-side user to perform reading intuitively by determining the multiplexed information embedding position in the corresponding object area. The mechanism is designed so that it is possible to switch between embedding with the object being overlapped and embedding without the object being overlapped depending on the kind of object. Whether a user desires to embed multiplexed information so as to overlap the object in the image or a user does not desire to do so is taken into consideration at the time of layout, and therefore, the load of a user is reduced.

There is a case where the area size necessary at the time of embedding multiplexed information is different depending on the number of bits of the multiplexed information or the setting of the embedding strength, but in the present embodiment, explanation is given by assuming that the area size is uniformly the same. In a case where the area size is different depending on multiplexed information, the embedding of the multiplexed information is performed with the area size in accordance with the multiplexed information to be embedded.

(1-2-8) Multiplexed Information Multiplexing Unit

A multiplexed information multiplexing unit 311 receives the image data converted by the resolution conversion unit 304 and the multiplexed information selected by the information selection unit 307 and embeds the multiplexed information in the image data. Further, at this time, the multiplexed information multiplexing unit 311 embeds the multiplexed information at the embedding position based on the processing results of the multiplexed information layout unit 310. In the embedding processing (multiplexing processing) in the present embodiment, information including "0" and "1" corresponding to binary data is embedded by performing mask processing for the image data so that the binary data including "0" and "1", which is multiplexed information, can be read. In this example, the image data in a predetermined area is caused to have a different periodicity corresponding to the binary data of "0" or "1" by performing the mask processing for the image data.

Figure 4A:
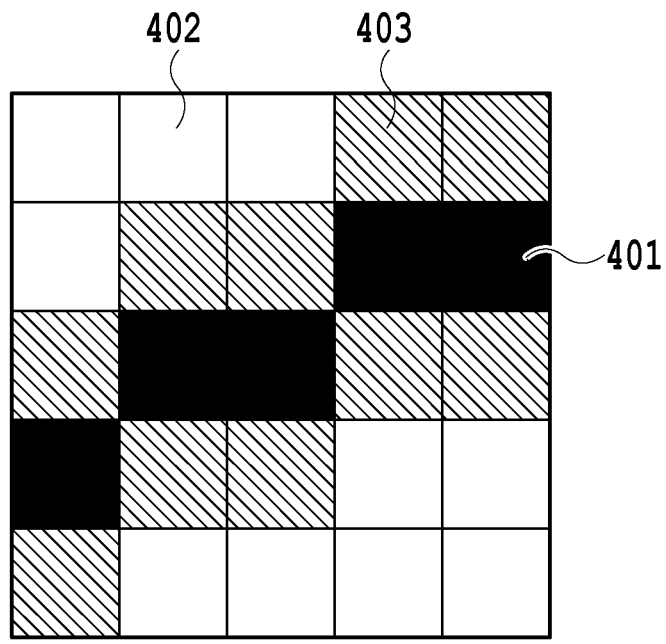
FIG. 4A and FIG. 4B are each a diagram showing a mask pattern used for image data processing.
Figure 4B:
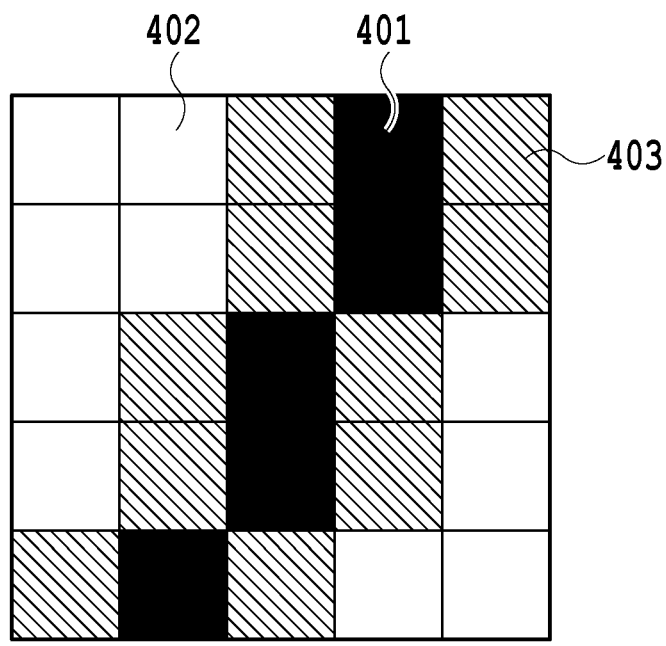

FIG. 4A and FIG. 4B each show mask data corresponding to binary data and the mask data in FIG. 4A corresponds to "0" and the mask data in FIG. 4B corresponds to "1". The mask data has a size corresponding to an area of 5 px×5 px. By combining (applying) a pattern having a different periodicity as in FIG. 6A or FIG. 6B with (to) the image data corresponding to the area of 5 px×5 px, the binary data of "0" or "1" is embedded. The multiplexed information multiplexing unit 311 embeds multiplexed information by causing the image data to have a periodicity corresponding to the binary data of "0" and "1" based on the binary data (numerical value data) of the multiplexed information. As an example of the embedding method of multiplexed information in image data, a method of embedding binary data of "0" and "1" in the entire image data on the assumption that the image data is one-colored gray image data.

It is assumed that the size of the image to be multiplexed is 640 px long and 480 px wide and the size of the mask data is 5 px×5 px as in FIG. 4A and FIG. 4B. It is assumed that the binary data of "0" is represented by the mask data in FIG. 4A and the binary data of "1" is represented by the mask data in FIG. 4B. In the mask data in FIG. 4A or FIG. 4B, the block of 5×5 pixels is divided into a black block 401, a white block 402, and a diagonal line block 403. The black block 401 corresponds to a numerical value of "+2", the white block 402 corresponds to a numerical value of "0", and the diagonal line block 403 corresponds to a numerical value of "−1". In a case where it is desired to embed 0, the mask data in FIG. 4A, which corresponds to "0", is used and in a case where it is desired to embed 1, the mask data in FIG. 4B, which corresponds to "1", is used. As will be described later in the explanation relating to the patterns in FIG. 6A and FIG. 6B, which are obtained by digitizing the patterns in FIG. 4A and FIG. 4B, by adding a value obtained by multiplying information to be embedded by a reference value, a pattern is formed.

There is a case where it is desired to form a pattern that is as unlikely to be visually conspicuous as possible to a person as a pattern corresponding to the binary data (numerical value data) of multiplexed information. In a case where the image data is one-colored gray image data as in this example, it is necessary to form a pattern by the luminance component, and therefore, the pattern is likely to be visually conspicuous. Although depending on the pattern shape and the frequency component, there is a tendency for the change in the color component to be more unlikely to be visually inconspicuous than the change in the luminance component. For example, a color image having RGB components is divided into the luminance component and the color component by converting the color image into image data in a color space, such as YCbCr, Lab, Yuv, or the like. Then, by applying the mask data to the color component, not to the luminance component, it is possible to form a pattern that is unlikely to be visually conspicuous.

In this example, the mask data is divided into blocks of 5 px×5 px and added to the image data. However, the unit of the block size and the mask shape are arbitrary and as a method of incorporating mask data in image data, it may also be possible to combine addition, subtraction, multiplication, and division. It may also be possible to adopt any method as long as the method can distinguish among the patterns of the mask data at the time of capturing a printed material of an image in which multiplexed information is embedded. Consequently, the multiplexed information multiplexing unit 311 is a processing unit configured to embed multiplexed information in image data so that the multiplexed information can be extracted at the time of capturing a printed material of an image in which the multiplexed information is embedded.

(1-2-9) Color Correction Unit

A color correction unit 312 performs conversion processing for image data so that the color of the image that is printed on a printing medium by the printing apparatus becomes a preferred color. For example, in a case where an image displayed on a display device, such as a monitor, is printed, the color reproduction range in the display device and the color reproduction range in the printing apparatus do not necessarily coincide with each other. There is a case where for a certain color, the reproduction range of the printing apparatus is narrow compared to that of the display device and for another color, the reproduction range of the printing apparatus is wide compared to that of the display device. Because of this, it is necessary to appropriately compress and decompress a color while minimizing the deterioration of the image. In the present embodiment, as an example, the processing is performed in the RGB format. That is, by taking into consideration the reproducibility of the printing apparatus, the RGB values input to the color correction unit 312 are converted into RGB values for the printing apparatus (hereinafter, also referred to as "printing apparatus RGB values"). This conversion can be performed by a matrix calculation, but generally, a three-dimensional color correction table 313 is made use of. In a case where it is assumed that each color of the RGB values to be input is represented by eight bits (256 tones), it is not realistic to store all the combinations from the standpoint of the storage capacity, and therefore, as the color correction table 313, a table in which thinning at predetermined intervals has been performed is used. Here, as an example, it is assumed that a table whose number of grid points is 17 is used.

(1-2-10) Ink Color Conversion Unit

An ink color conversion unit 314 converts the printing apparatus RGB values acquired by the conversion of the color correction unit 312 into values of ink colors (for example, CMYK values). For this conversion, a color separation table 315 is used in which a combination of the printing apparatus RGB values and a combination of the values of ink colors (for example, CMYK values) are associated with each other in advance. As in the color correction unit 312, a table whose number of grid points is 17 is made use of also in the ink color conversion unit 314.

(1-2-11) Density Correction Unit

In the ink jet printing apparatus, as the amount of ink increases, which is attached to form dots on a printing medium, such as a printing sheet, the overlap of dots increases in number, and therefore, the density in the printed image becomes unlikely to rise. A density correction unit 316 corrects the density in order to make uniform the responsiveness of the density such as this. By the density correction such as this, it is made easier to secure the creation accuracy of the color correction table 313 and the color separation table 315. In the printing apparatus that uses the four color inks of CMYK, the density correction is performed for those ink colors. In the present embodiment, as an example, a one-dimensional density correction table 317 is used. As this table, it is sufficient to prepare in advance a table corresponding to the input eight bits (256 tones) of each ink color and it is possible to use a table in which the input signal value and the corrected output signal value are associated with each other without the need to perform thinning particularly.

(1-2-12) Tone Conversion Unit

A tone conversion unit 318 converts multi-bit data for which the density correction has been performed for each ink color into data of the number of tones that can be printed in the printing apparatus. In the present embodiment, as an example, multi-bit data is converted into (1-bit) data of two tones of printing "1" or non-printing "0". Further, as the tone conversion method, the error diffusion method is adopted which can reproduce visually preferred tones by excluding the low-frequency component of an image. Further, as the input signal (multi-bit data), 8-bit data whose pixel values are 0 to 255 is supposed.

By performing tone conversion for all the ink colors of C, M, Y, and K, one-bit print data of each ink color that can be printed by the printing apparatus 103 is obtained.

(1-3) Multiplexing Encoding Processing

Figure 5:
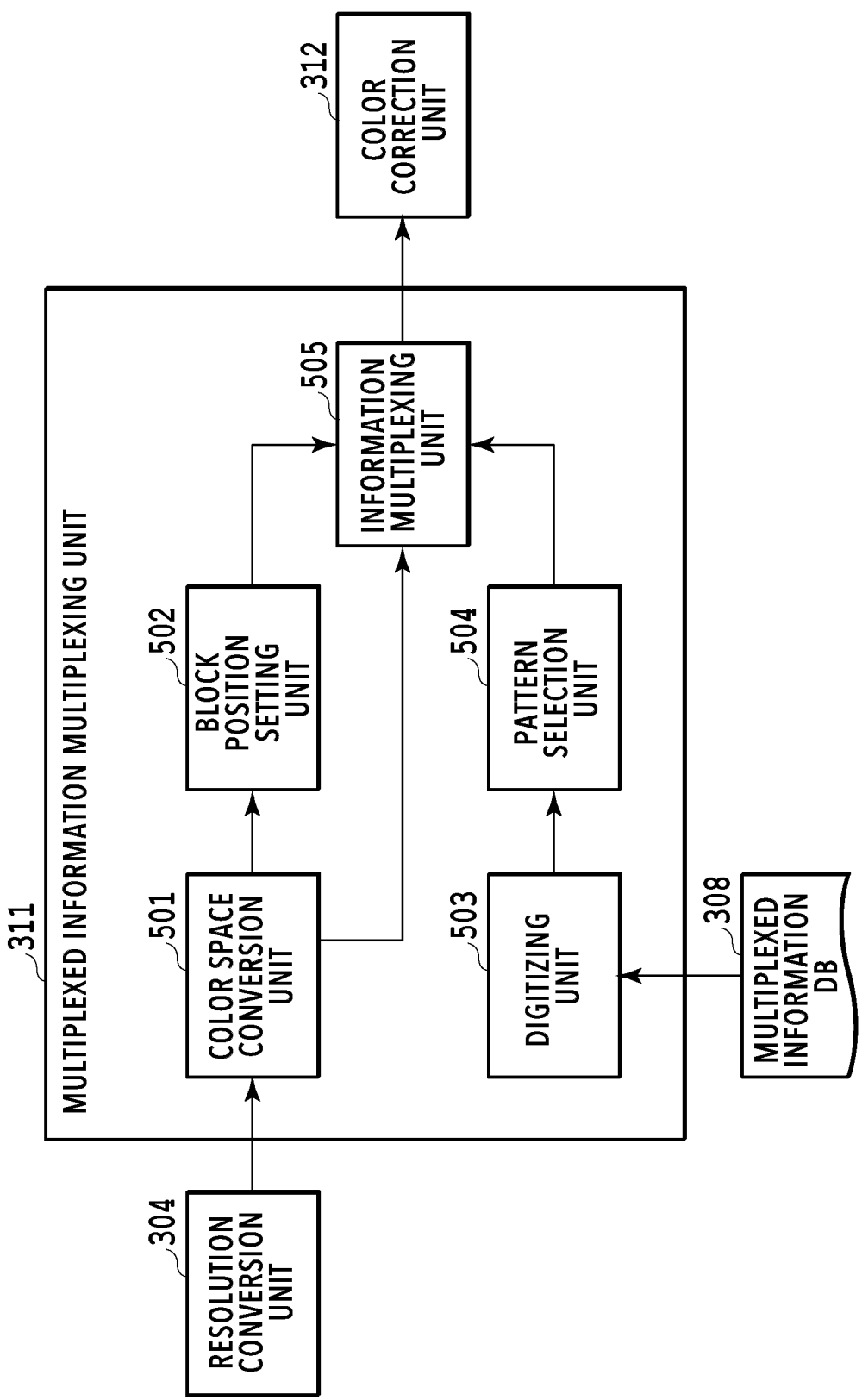
FIG. 5 is a block diagram showing a detailed configuration of a multiplexing unit in the first embodiment.

FIG. 5 is a block diagram for explaining a firmware configuration of the multiplexed information multiplexing unit 311 (see FIG. 3). In the following, each processing unit of the multiplexing unit 311 is explained.

(1-3-1) Color Space Conversion Unit

A color space conversion unit 501 is a processing unit configured to convert the color space of image data whose resolution has been changed to that compatible with the printing apparatus in the resolution conversion unit 304 into a color space for information multiplexing. For example, as in formulas below, the color space for performing information multiplexing is taken as U of YUV and the color space of RGB of the image data is converted into the color space of YUV.

[Mathematical formula 1]

$$Y=0.299 \times R+0.587 \times G+0.114 \times B \quad \text{formula (1)}$$

[Mathematical formula 2]

$$U=-0.169 \times R-0.331 \times G+0.500 \times B \quad \text{formula (2)}$$

[Mathematical formula 3]

$$V=0.500 \times R-0.419 \times G-0.081 \times B \quad \text{formula (3)}$$

(1-3-2) Block Position Setting Unit

Figure 9A:
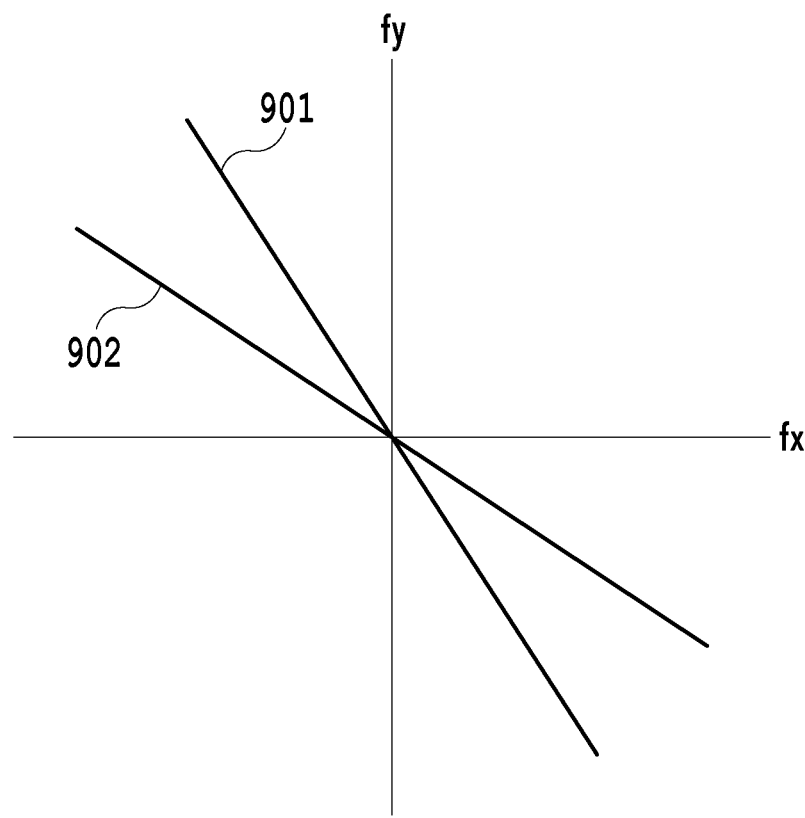
FIG. 9A and FIG. 9B are explanatory diagrams of a determination method of a frequency characteristic of image data by an information-multiplexed position detection unit.
Figure 9B:
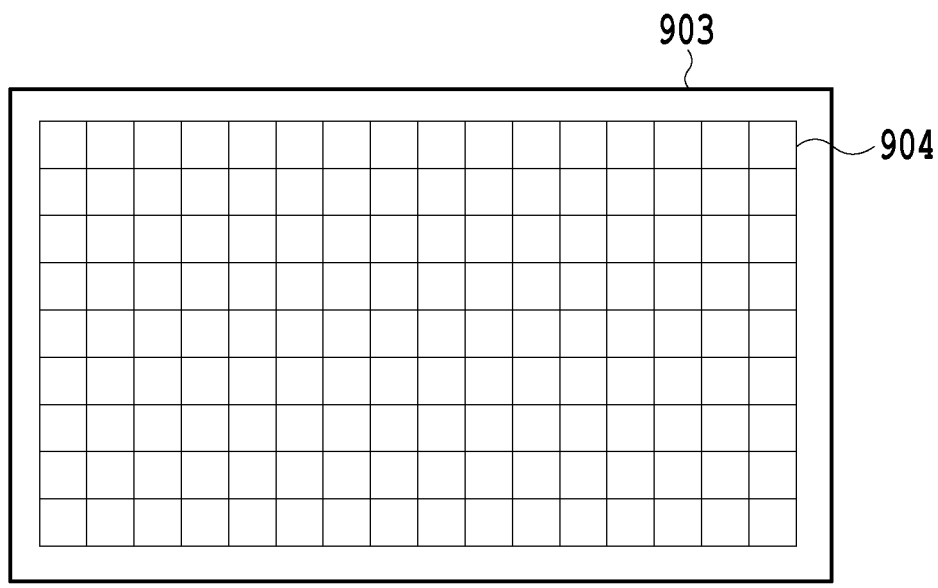

In the present embodiment, multiplexed information is embedded by dividing image data into a plurality of block areas, modulating the density of each pixel for each block, and forming a pattern corresponding to the mask data in FIG. 9A or FIG. 9B. A block position setting unit 502 acquires image data for which color space conversion has been performed and sets the position coordinates of the block in accordance with the size of the one specified block for the plane image of the specified color. For example, it is assumed that the size of the plane image of the U color of YUV is 640 px long and 480 px wide and the block size is 5 px long and 5 px wide. In this case, the number of longitudinal blocks is 128 (=640÷5), the number of horizontal blocks is 96 (=480÷5), and the total number of blocks in which multiplexed information can be embedded is 12,288 (=128×96). By using a plurality of blocks, it is possible to improve the accuracy of multiplexed information reading. It is possible to arrange side by side the blocks of the multiplexed information relating to a certain object within the image position specified by the multiplexed information layout unit 310 and thereby, it is possible to complement information by another block even in a case where a certain block deteriorates by a surface flaw that prevents reading.

(1-3-3) Digitizing Unit

A digitizing unit 503 converts the received multiplexed information into digitized data. For example, it is assumed that the multiplexed information received by the digitizing unit 503 is a string of characters of Shift JIS. In this case, a conversion map in which characters and numerical values are associated with each other in the Shift JIS format is stored in advance and a character string is converted into a numerical value string by using the conversion map. For example, in a case where the multiplexed information acquired from the multiplexed information DB 308 is a character string of "hello", the numerical value string after being converted is "0110100001100101011011000110110001101111".

(1-3-4) Pattern Selection Unit

In a pattern selection unit 504, mask patterns for performing density modulation of each pixel for each block are registered and the pattern selection unit 504 selects a mask pattern to be applied to the multiplexed information digitized by the digitizing unit 503.

FIG. 6A and FIG. 6B are each a diagram obtained by digitizing each of the patterns whose frequency characteristics are different in FIG. 4A and FIG. 4B. As described previously, the patterns in FIG. 4A and FIG. 6A correspond to "0" of binary data and the patterns in FIG. 4B and FIG. 6B correspond to "1" of binary data.

(1-3-5) Information Multiplexing Unit

An information multiplexing unit 505 acquires the image data for which color space conversion has been performed by the color space conversion unit 501, the position of each block set by the block position setting unit 502, and the mask pattern selected by the pattern selection unit 504. The information multiplexing unit 505 generates image data in which the mask pattern is applied to the specified area of the image data based on these acquired pieces of information.

For example, a case is studied where the image data is taken to be the U color plane of YUV, the U color plane is processed for each block (5 px×5 px) belonging to the inside of the specified area, and the value of the mask pattern in FIG. 6A or FIG. 6B is applied to the value of the U color plane of YUV. Here, as an example, as expressed by a formula below, it is assumed that addition/subtraction processing is performed for the value (referred to as U value) of the U color plane of YUV in accordance with the numerical value of these mask patterns and the reference value on the basis of which the addition/subtraction processing is performed is taken to be 10.

[Mathematical formula 4]

$$U \text{ value after application} = U \text{ value of } YUV + \text{reference value} \times \text{numerical value of mask pattern} \quad \text{formula (4)}$$

For example, in a case where the U value of one pixel within one block is "20" and the numerical value of the mask pattern to be applied is "0", the U value is processed as in formula (5).

[Mathematical formula 5]

$$U \text{ value after application}=20+10\times 0=20 \quad \text{formula (5)}$$

Further, for example, in a case where the U value of one pixel within one block is "30" and the numerical value of the mask pattern to be applied is "2", the U value is processed as in formula (6).

[Mathematical formula 6]

$$U \text{ value after application}=30+10\times 2=50 \quad \text{formula (6)}$$

Furthermore, for example, in a case where the U value of one pixel within one block is "40" and the numerical value of the mask pattern to be applied is "−1", the U value is processed as in formula (7).

[Mathematical formula 7]

$$U \text{ value after application}=40+10\times(-1)=30 \quad \text{formula (7)}$$

As above, in the present embodiment, multiplexing is implemented by adding the value obtained by multiplying the numerical value of the mask pattern to be applied and the reference value for each pixel. As the application method of a mask pattern, it may be possible to adopt any method as long as it is possible to embed a mask pattern on the U color plane by the method, and the method is not limited to the method described here.

The multiplexing encoding processing such as this is performed by the multiplexing apparatus 102 in FIG. 1A or the multiplexing unit 105 in FIG. 1B. The component that performs the multiplexing encoding processing may not be included in the printing apparatus 103 or may be included in the printing apparatus 103. The image data after the multiplexing encoding processing, which is generated by the multiplexing apparatus 102 or the multiplexing unit 105, is transmitted to the printing apparatus 103 or the printing unit 106.

(1-4) Printing Processing Based on Image Data

Figure 7:
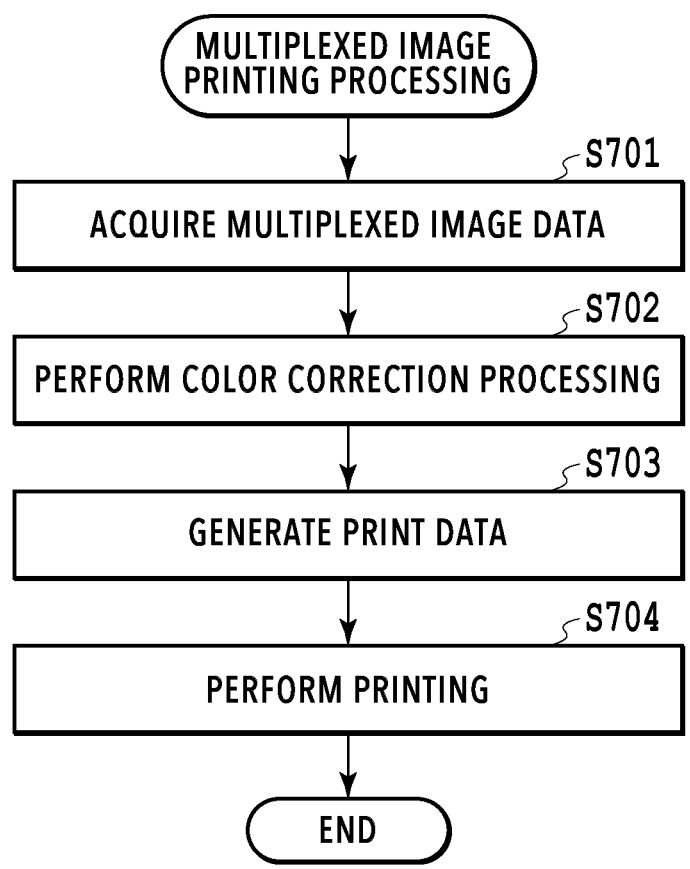
FIG. 7 is a flowchart for explaining printing processing based on image data after multiplexing encoding processing.

FIG. 7 is a flowchart for explaining printing processing based on image data after multiplexing encoding processing.

First, at S701, the color correction unit 312 (see FIG. 3) acquires image data in which multiplexed information is embedded (referred to as multiplexed image data) by the multiplexed information multiplexing unit 311.

Next, at S702, the color correction unit 312 performs color correction for the multiplexed image data.

Next, at S703, the CPU generates print data. Specifically, by the ink color conversion unit 314, the density correction unit 316, and the tone conversion unit 318, the CPU generates print data by correcting the density after converting the image data for which color correction has been performed into the value of the ink color and converting the image data for which the density correction has been performed into image data of a predetermined number of tones. The generated print data is transmitted to the printing engine.

At S704, the printing engine generates the printed material C by attaching the ink of each color onto a printing medium based on the transmitted print data.

(1-5) Firmware Configuration for Multiplexing Decoding Processing

Figure 8:
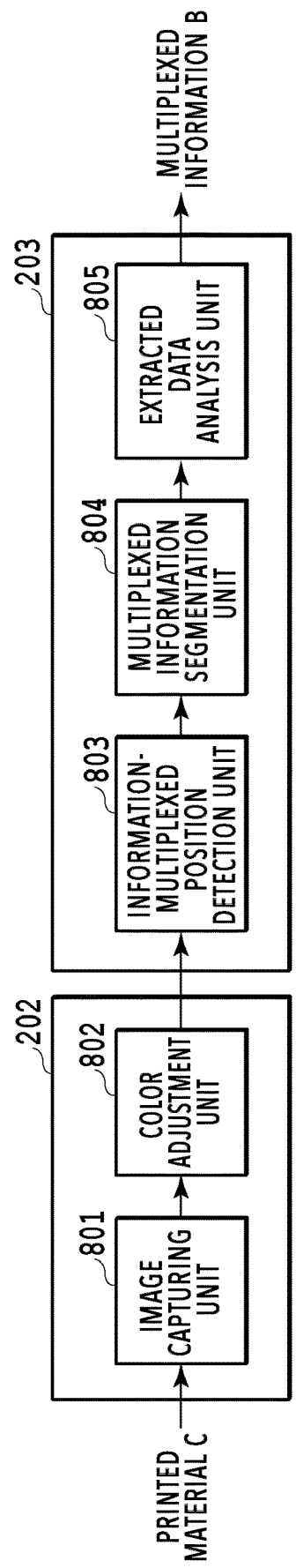
FIG. 8 is a block diagram of the multiplexing decoding processing unit in the first embodiment.

FIG. 8 is a block diagram of a basic firmware configuration for multiplexing decoding processing to extract multiplexed information embedded in a printed image of the printed material C.

As shown in FIG. 8, the imaging sensor 202 (see FIG. 2) has an image capturing unit 801 and a color adjustment unit 802. Further, the multiplexed information segmentation apparatus 203 has an information-multiplexed position detection unit 803, a multiplexed information segmentation unit 804, and an extracted data analysis unit 805. Furthermore, data of digitized multiplexed information, such as text document data, voice data, and moving image data, is embedded in the printed image of the printed material C.

(1-5-1) Image Capturing Unit

The image capturing unit 801 acquires image data by capturing the printed image of the printed material C by an image capturing element within the imaging sensor 202.

As the image capturing element within the image capturing unit 801, it is possible to adopt a CCD and the CCD senses light by a photodiode (light receiving element) and changes the light into a voltage. At this time, by RGB or CMY color filers or the like arranged in each image capturing element, it is possible to convert the light into color data. The detected signal of the photodiode is sent to the color adjustment unit 802.

(1-5-2) Color Adjustment Unit

The color adjustment unit 802 converts the output data of the photodiode in the image capturing unit 801 into 8-bit image data in which one pixel has three channels of RGB. Before the conversion into image data is performed, interpolation processing of colors, such as RGB, is performed for the output data of the photodiode in accordance with the light source at the time of image capturing. The interpolation processing corresponds to, for example, performing adjustment so that a white object can be captured white at the time of performing image capturing by using the mobile terminal 201 or the like. The image capturing unit 801 detects the light radiated from a light source, such as the sun and a light, and reflected from an object by the photodiode, and therefore, the color of the image differs in accordance with the light source. Consequently, the color adjustment unit 802 performs the interpolation processing in accordance with the light source.

As a method of interpolation processing, there is a method that uses the unit Kelvin (K) obtained by digitizing the color of light represented by the color temperature indicating the shade of color of a light source. The sun light in the daytime is 5,500K, the incandescent light bulb is 3,000K and in general, the higher the color temperature, the bluer the light appears and the lower the color temperature, the redder the light appears. Because of this, the color of a captured image differs in accordance with a light source. The mobile terminal 201 usually mounts the so-called automatic white balance adjustment function that automatically performs adjustment so that a white object can be captured white by detecting the color temperature with a sensor at the time of performing image capturing. Further, it is also possible to adjust the white balance manually in accordance with a light source, such as the sun light or the incandescent light bulb.

The color adjustment unit 802 generates image data whose white balance has been adjusted based on the output data of the photodiode and sends the generated image data to the multiplexed information segmentation apparatus 203.

(1-5-3) Information-Multiplexed Position Detection Unit

To the information-multiplexed position detection unit 803, image data for which color adjustment has been performed by the color adjustment unit 802 is input. The information-multiplexed position detection unit 803 detects a position at which multiplexed information is embedded (referred to as information-multiplexed position) by determining the frequency characteristic of the image data.

FIG. 9A is an explanatory diagram of the difference in the frequency characteristic in a two-dimensional frequency area and the horizontal axis represents the frequency in the horizontal direction, the vertical axis represents the frequency in the vertical direction, and the origin, which is the center, represents the direct-current component and the more distant from the origin, the higher the frequency is. In this example, by the multiplexing processing, the frequency characteristic changes.

For example, as described previously, by the change in the frequency characteristic in a case where the mask pattern in FIG. 4A is applied, a large power spectrum occurs on a straight line 901 in FIG. 9A. Further, by the change in the frequency characteristic in a case where the mask pattern in FIG. 4B is applied, a large power spectrum occurs on a straight line 902 in FIG. 9A. At the time of segmentation of multiplexed information, in order to determine a multiplexed signal, a frequency vector on which the large power spectrum such as this occurs is detected. Because of this, it becomes necessary to individually enhance and extract each frequency vector.

To this end, it is recommended to use a high-pass filter having the same frequency characteristic as that of the mask pattern in FIG. 6A or FIG. 6B. It is possible for a spatial filter corresponding to the mask pattern in FIG. 6A to enhance the frequency vector on the straight line 901 in FIG. 9A. It is possible for a spatial filter corresponding to the mask pattern in FIG. 6B to enhance the frequency vector on the straight line 902 in FIG. 9A.

For example, it is assumed that a large power spectrum has occurred on the frequency vector on the straight line 901 in FIG. 9A due to the quantization condition that applies the mask pattern in FIG. 6B. In this case, the amount of the change in the power spectrum is amplified by the spatial filter corresponding to the mask pattern in FIG. 6A, but hardly amplified by the spatial filter corresponding to the mask pattern in FIG. 6B. That is, in a case where filtering is performed by using a plurality of spatial filters in parallel, the power spectrum is amplified only by the spatial filter whose frequency vector is the same but hardly amplified by the other spatial filters. Consequently, by specifying the spatial filter that amplifies the power spectrum, it is possible to determine on which frequency vector the large power spectrum has occurred. By specifying the frequency characteristic as described above, it is possible to extract multiplexed information. At this time, in a case where the extraction position of multiplexed information shifts, it becomes difficult to correctly extract multiplexed information.

FIG. 9B is an explanatory diagram of a printing area in the printed material C. A printing medium 903 as the printed material C includes an area 904 in which information is multiplexed for each block and in the area 904, multiplexed information is embedded so as to have a specific frequency characteristic.

Figure 10A:
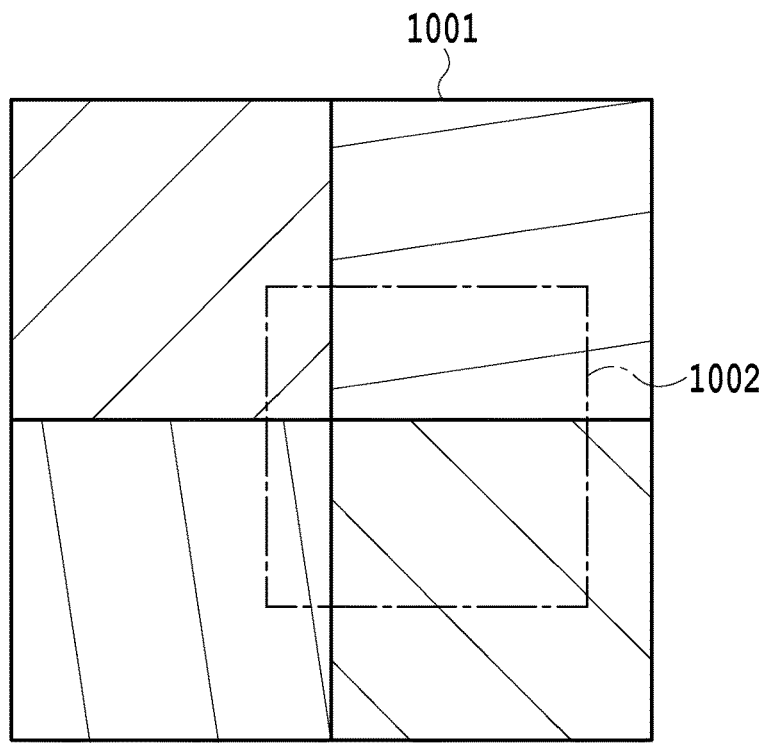
FIG. 10A and FIG. 10B are explanatory diagrams of a relationship between the frequency characteristic of image data and a determination area.
Figure 10B:
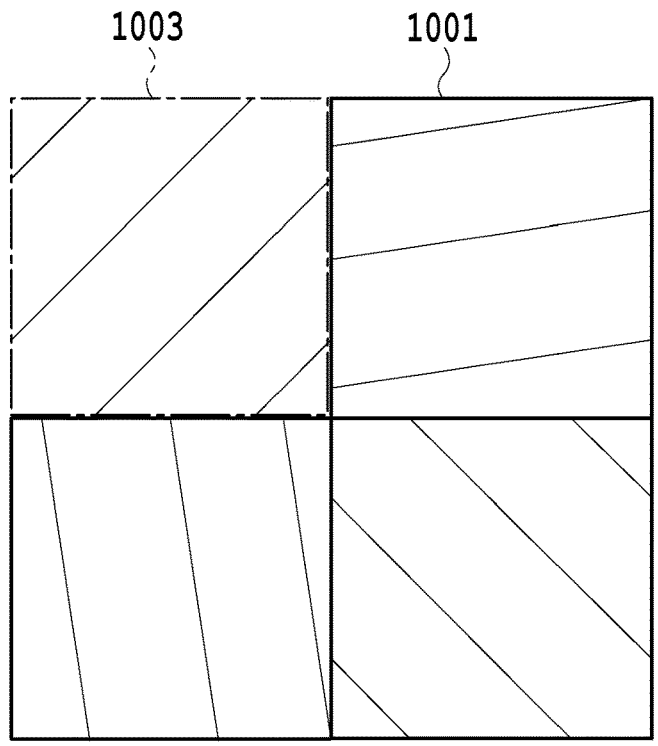

FIG. 10A and FIG. 10B are each an explanatory diagram of a relationship between information-multiplexed blocks and an area in which the frequency characteristic is determined and as shown schematically, on the printing medium, information is multiplexed in four blocks. In FIG. 10A, a determination area 1002 in which the frequency characteristic of each block is determined is shifted from the position of the block (that is, the determination area 1002 extends over a plurality of blocks). On the other hand, in FIG. 10B, a determination area 1003 in which the frequency characteristic of each block is determined coincides with the position of the block (that is, the determination area 1003 does not extend over a plurality of blocks). In a case of FIG. 10A, it is possible to correctly determine the frequency characteristic in the determination area 1002. On the other hand, in a case of FIG. 10B, the power spectrum of a specific frequency vector is reduced in the determination area 1003, and therefore, it is difficult to correctly determine the frequency characteristic.

The information-multiplexed position detection unit 803 determines the frequency characteristic of each block in which information is multiplexed by making use of a spatial filter. At that time, it is necessary to specify the position of the information-multiplexed block. It is possible to specify the position of the information-multiplexed block based on the intensity of the power spectrum of the specific frequency vector. Because of this, the information-multiplexed position detection unit 803 specifies the position of the information-multiplexed block by detecting the frequency characteristic while shifting the determination area of the frequency characteristic of each block for the captured image and determining the detected frequency characteristic.

(1-5-4) Multiplexed Information Segmentation Unit

The frequency characteristic of each block is determined by taking the position of the block detected by the information-multiplexed position detection unit 803 as a reference and the multiplexed information segmentation unit 804 extracts multiplexed information that is multiplexed based on the determination results of the frequency characteristic of each block.

(1-5-5) Extracted Data Analysis Unit

The extracted data analysis unit 805 analyzes the numerical value string segmented as multiplexed information by the multiplexed information segmentation unit 804 and converts the numerical value string into the format of the original multiplexed information before the embedding.

For example, multiplexed information to be multiplexed is assumed to be text document data and the character codes thereof are digitized in advance into character codes of "Shift JIS". In the single-byte code (half-width character) of Shift JIS, it is possible to perform conversion (digitizing) corresponding to numerical values and characters by a combination of four high-order bits and four low-order bits. For example, in a case where the four high-order bits are "0100" and the four low-order bits are "0001", the numerical value string is determined to be a character of "A". As described above, it is possible to convert a numerical value string into a character by storing a conversion map in advance and causing the conversion map and the numerical value string to correspond to each other. For example, it is possible to temporarily store a numerical value string segmented as multiplexed information in the RAM 206 in FIG. 2 and store in advance the "Shift JIS" conversion map in the secondary storage device 207 so that the map can be referred to.

A case is supposed where a numerical value string of "01101000011001010110110001101100011011111" is segmented as multiplexed information by the multiplexed information segmentation unit 804. This numerical value string is converted as follows by a conversion map.

The first four high-order bits "0110" and the four low-order bits "1000" are converted into a character of "h". The next four high-order bits "0110" and the four low-order bits "0101" are converted into a character of "e". The next four high-order bits "0110" and the four low-order bits "1100" are converted into a character of "1". The next four high-order bits "0110" and the four low-order bits "1100" are converted into a character of "1". The last four high-order bits "0110" and the four low-order bits "1111" are converted into a character of o". Consequently, the numerical value string is converted into a character string of "hello".

It is possible to display the character string extracted as multiplexed information in this manner on, for example, the display 208 in FIG. 2. Further, in a case where the extracted character string is a URL, it is also possible for the CPU 204 to connect to the network via the wireless LAN 210 in FIG. 2 and display the screen of the URL destination on the display 208 by making use of a browser. Furthermore, in a case where the URL is a moving image site, it is also possible for the CPU 204 to display a moving image on the display unit 208 and sound a voice through the speaker 211.

(1-6) Multiplexing Decoding Processing

Figure 11:
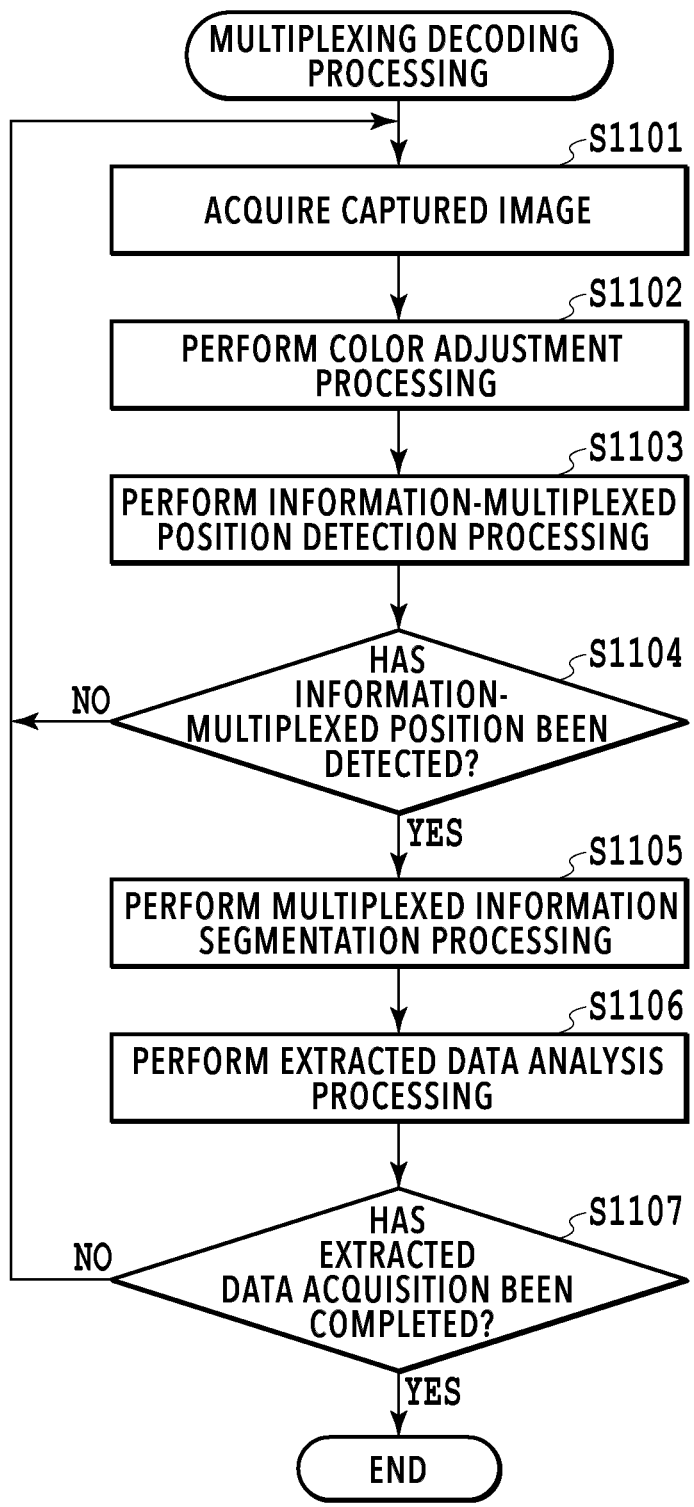
FIG. 11 is a flowchart of multiplexing decoding processing in the first embodiment.

FIG. 11 is a flowchart of multiplexing decoding processing in the present embodiment.

First, at S1101, the imaging sensor of the image capturing unit 801 (see FIG. 8) in the mobile terminal 201 captures the printed image of the printed material C. By this step, a captured image (data) is acquired. The light captured by the image capturing unit 801 is converted into color data and then transmitted to the color adjustment unit 802.

At S1102, the color adjustment unit 802 generates image data by performing white balance adjustment for the output data of the photodiode in the image capturing unit 801. The image data generated by the color adjustment unit 802 is transmitted to the multiplexed information segmentation apparatus 203 or stored in the secondary storage device 207 (see FIG. 2).

At S1103, the information-multiplexed position detection unit 803 detects the position at which information is multiplexed based on the image data for which white balance has been adjusted at S1102.

At S1104, the information-multiplexed position detection unit 803 determines whether it has been possible to detect the position of the block in which information is multiplexed. In a case where the determination results at this step are affirmative, the processing advances to S1105. On the other hand, in a case where the determination results at this step are negative, the processing returns to S1101 and the processing for the next captured image is performed.

At S1105, the multiplexed information segmentation unit 804 determines the frequency characteristic of each block based on the image data generated at S1102 and the position of the block detected at S1103. Then, the multiplexed information segmentation unit 804 extracts the multiplexed information that is multiplexed as numerical value data based on the determination results. The numerical value data extracted by the multiplexed information segmentation unit 804 is transmitted to the extracted data analysis unit 805. Alternatively, this numerical value data may be transmitted to the extracted data analysis unit 805 after being temporarily stored in the RAM 206.

At S1106, the extracted data analysis unit 805 analyzes the numerical value data extracted as multiplexed information and converts the analyzed numerical value data into output information, such as a character. At S1107, the extracted data analysis unit 805 determines whether the conversion into output information by the analysis unit 805 has been completed for all the extracted numerical value data. In a case where the determination results at this step are affirmative, the multiplexing decoding processing is terminated. On the other hand, in a case where the determination results at this step are negative, the processing returns to S1101. The output information converted into a character or the like can be displayed on the display 208 or the like and further, it is possible for the camera-attached mobile terminal (information processing apparatus) 201 to access the network based on the output information.

Effects of the Present Embodiment

In the present embodiment, in the state where the training data DB used for object recognition and the DB storing multiplexed information are associated with each other, the multiplexed information corresponding to the recognized object is selected automatically. Due to this, no load is imposed on an embedding-side user and it is possible to multiplex optimum multiplexed information in the object.

Further, in the present embodiment, the multiplexed information corresponding to the selected object is embedded at the position that overlaps the area of the recognized object. Due to this, it is possible to perform embedding of multiplexed information, which takes into consideration the position at which a reading-side user holds the terminal above, without imposing a load on an embedding-side user.

Second Embodiment

In the first embodiment, the object recognition results and multiplexed information are associated with each other in a one-to-one correspondence manner and multiplexed information is selected by using association information (or not selected). However, there is a case where a plurality of selection candidates of multiplexed information corresponding to the object recognition results exists. In order to select optimum multiplexed information from a plurality of selection candidates, in the present embodiment, a step of evaluation processing is provided. This evaluation processing is performed by the information selection unit 307 in FIG. 3.

FIG. 16A to FIG. 16C are each a diagram for explaining the second embodiment, showing a specific example of a DB. FIG. 16A shows a database of training data used for object recognition. FIG. 16B is a database of multiplexed information. FIG. 16A is similar to FIG. 12A and FIG. 16B is similar to FIG. 12C. The present embodiment differs from the embodiment described previously in using a database holding association information as in FIG. 16C.

In FIG. 16C, Multiplexed information No values $B_1$ to $B_8$ are associated with Association No values $S_1$ to $S_9$. Both the Association No values $S_2$ and $S_6$ correspond to the Multiplexed information No value $B_2$. Similarly, Object No values $I_1$ to $I_5$ do not correspond to the Association No values or the Multiplexed information No values in a one-to-one correspondence manner. In the present embodiment, Number of objects, Object size, and Object position are used as conditions for selecting association information. Number of objects, Object size, and Object position are sometimes called information relating to the object other than the information on the kind of object. The database (table) shown in FIG. 16C is an example and it may also be possible to use a database not holding part of the items in FIG. 16C or use a database holding an item other than these items.

Each of the Association No values $S_1$ and $S_4$ corresponds to the same Object No value $I_3$ and in order to uniquely find the Association No value corresponding to a certain object, the Association No values are distinguished from each other based on the position of the object area within the image. In this example, as shown in FIG. 16C, a predetermined threshold value Y_TH is set to Object position and in a case where the Y-coordinate of the object within the image is larger than or equal to the threshold value, the Association No value is taken to be $S_1$ and in the other case, the Association No value is taken to be $S_4$. It is assumed that the origin is located at the top left of the image. As a use case where the embodiment such as this is effective, mention is made of a large-size poster. In a case of a large-size poster whose printed material is large, depending on a reading-side user, the position at which the terminal, such as a smartphone, is held above is different despite that the object is the same. In a case where it is supposed that while an adult holds the terminal above the object at a high position, a child holds the terminal above the object at a low position, it is effective to make the multiplexed information to be embedded in the object different between that for an adult and that for a child. It is possible to use multiplexed information, which is the same character information, in accordance with its purpose, such as that the multiplexed information for an adult includes kanji and hiragana and the multiplexed information for a child includes only hiragana. In a case where it is supposed that the Association No values $S_1$ and $S_4$ in FIG. 16C are used separately between an adult and a child, the Association No value $S_4$ is for an adult and the Association No value $S_1$ is for a child.

Each of the Association No values $S_2$ and $S_9$ corresponds to the same Object No value $I_1$ and in order to uniquely find the Association No value corresponding to a certain object, the Association No values are distinguished from each other based on the size of the object area (Object size) within the image. In this example, as shown in FIG. 16C, a predetermined threshold value SIZE_TH is set to Object size and in a case where Object size within the image is larger than or equal to the threshold value, the Association No value is taken to be $S_2$ and in the other case, the Association No value is taken to be $S_9$. As a use case where the embodiment such as this is effective, mention is made of a case where detailed multiplexed information and simplified multiplexed information on the same object are used separately. To explain specifically, in accordance with whether the same object is described large or described small on a page of a booklet, whether or not the object is described as a main object on the page is known. In a case where the object is described large, the detailed multiplexed information is selected and on the other hand, in a case where the object is described small, the simplified multiplexed information is selected. The simplified multiplexed information has a small amount of data to be embedded, and therefore, it is possible to embed in a small area within the image. In a case where the simplified multiplexed information is selected on a condition that the object is not described as a main object on the page, it is possible to avoid as much as possible the multiplexed information from being embedded overlapping the multiplexed information associated with the object that is described as a main object.

Each of the Association No values $S_7$ and $S_8$ corresponds to the same Object No value $I_5$ and in order to uniquely find the Association No value corresponding to a certain object, the Association No values are distinguished from each other based on Number of objects within the image. In this example, as shown in FIG. 16C, a predetermined threshold value NUM_TH is set to Number of objects and in a case where Number of objects within the image is larger than or equal to the threshold value, the Association No value is taken to be $S_7$ and in the other case, the Association No value is taken to be $S_8$. As a use case where the embodiment such as this is effective, mention is made of a case where multiplexed information for group information and multiplexed information for individual information are used separately. For example, in a case where a plurality of garments is recognized in the neighborhood as a result of recognizing the objects, group information, such as introduction of the bland of the garments, is embedded as multiplexed information. On the other hand, in a case where one garment is recognized, individual information, such as the product name and the price of the garment, is embedded as multiplexed information.

It may also be possible to prepare association information whose Object No value is blank like the Association No value $S_5$. In this case, the Multiplexed information No value $B_5$ is selected on a condition that Object size of an arbitrary object satisfies a predetermined condition (Size≥SIZE_TH) irrespective of the kind of object.

In a case where FIG. 16C is used, there is a possibility that one object coincides with the conditions for selecting a plurality of pieces of association information. For example, it is assumed that there is an object within the image, which corresponds to Object No "$I_1$" and whose size is larger than or equal to TH. This object corresponds to the Association No values "$S_2$" and "$S_5$". In order to select multiplexed information from a plurality of association conditions in the case such as this, it is effective to provide a step of evaluation processing. As the evaluation method, in addition to the method of performing selective determination based on the condition for selecting association information as described above, there is a method of evaluating the degree of relation by calculating the total sum of weights. The weights of Object No, Number of objects, Object size, and Object position are set as $\alpha_1$, $\alpha_2$, $\alpha_3$, and $\alpha_4$, respectively. As expressed in formula (8), in a case where each condition is met, an evaluation value is calculated by performing cumulative addition of the weights. The Association No value whose final evaluation value is the highest is selected and the Multiplexed information No value at that time is output.

[Mathematical formula 8]

$$SUM_{S_L} = \sum_{o=1}^{4} T_o \times \alpha_o \qquad \text{formula (8)}$$

$S_L$ indicates each value of Association No. T is a variable indicating 1 in a case where each of the conditions of Object No, Number of objects, Object size, and Object position given to Association No is met and −1 in a case where the condition is not met. It is assumed that in a case where the condition given to Association No is blank, such as "-" in FIG. 16C, T is taken to be 0 (T=0). The value of Multiplexed information No associated with that whose value of SUM is large is taken as the final selection results.

For example, both the Association No values $S_2$ and $S_5$ have the same Object size condition, but while the Association No value $S_2$ specifies the Object No value $I_1$, the Association No value $S_5$ does not specify anything. In a case where nothing is specified, T is zero (T=0), and therefore, the evaluation value is reduced accordingly. In a case where it is assumed that all the weights are the same value and the Object No value of the recognized object is $I_1$ and Object size satisfies Size≥SIZE_TH, as evaluation results, the Multiplexed information No value $B_2$ is selected for the target object. However, in a case where the Object No value of the recognized object is not $I_1$, the Multiplexed information No value $B_5$ is selected for the target object.

It is also possible to set a threshold value to SUM. In that case, on a condition that SUM corresponding to all the Association No values does not exceed a threshold value, a value indicating "non-selection" is output as selection results. The layout processing for a target object that is determined to be "non-selection" is the same as that of the first embodiment.

Figure 17:
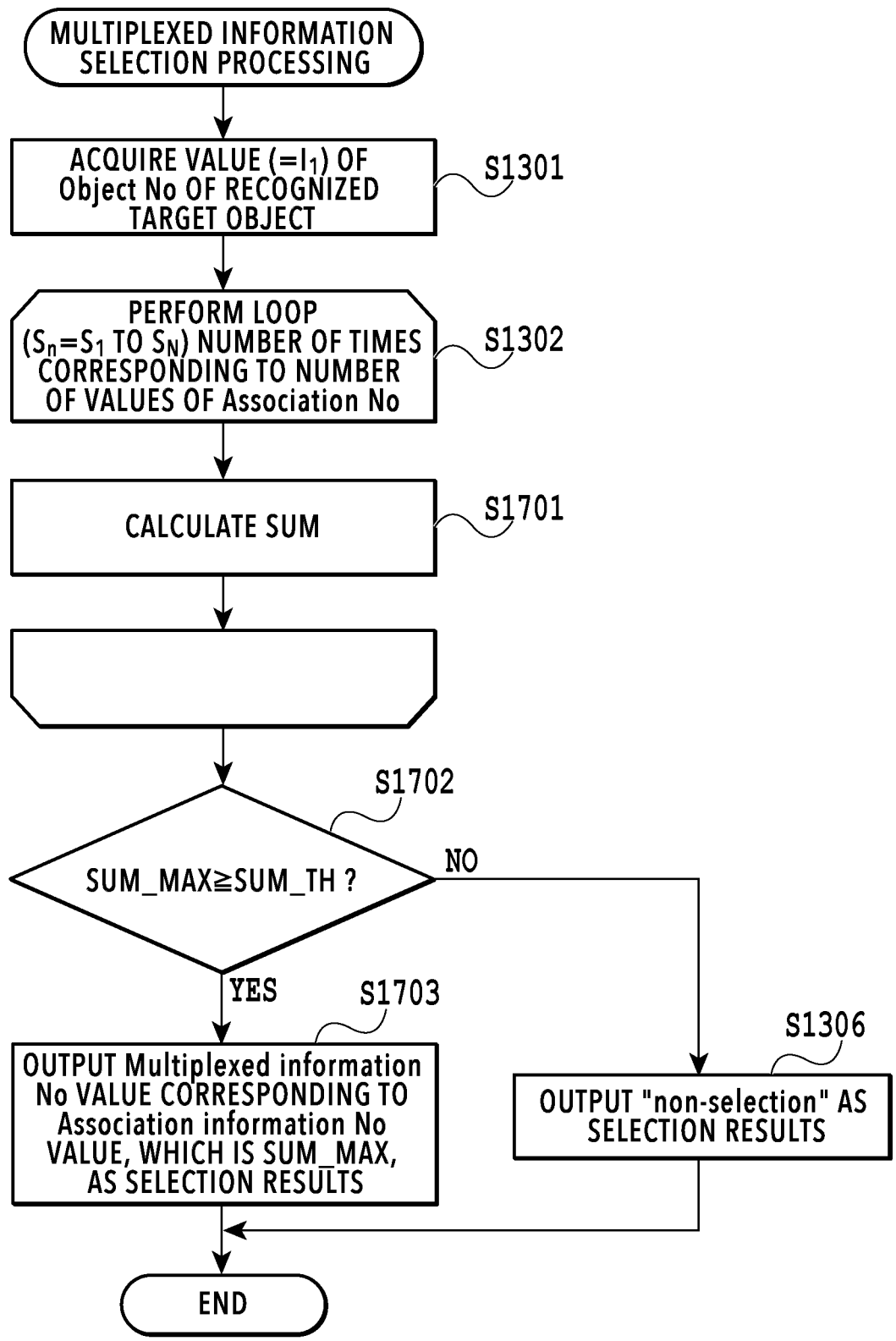
FIG. 17 is a flowchart of information selection processing in the second embodiment.

FIG. 17 is a flowchart of information selection processing in the present embodiment. Explanation of each step in FIG. 17, which is the same as the step in the first embodiment, is omitted (see FIG. 13).

At S1701, the information selection unit 307 calculates an evaluation value SUM corresponding to the Association No value of interest.

At S1702, the information selection unit 307 sets the largest value of the evaluation values SUM corresponding to all the Association No values as SUM_MAX. Then, the information selection unit 307 determines whether SUM_MAX is larger than or equal to a predetermined threshold value SUM_TH. In a case where the determination results at this step are affirmative, the processing advances to S1703 and on the other hand, in a case where the determination results are negative, the processing advances to S1306.

At S1703, the information selection unit 307 outputs the Multiplexed information No value corresponding to the Association No value, which is SUM_MAX, and the CPU of the image processing apparatus acquires the output value.

Effects of the Present Embodiment

In the present embodiment, in order to associate object information relating to a variety of use cases and multiplexed information with each other, multiplexed information is selected by using a plurality of evaluation items and evaluation steps. Due to this, multiplexed information is selected automatically for a variety of use cases, and therefore, the load of a user is reduced.

Further, by using the evaluation step, it is also possible to determine whether to embed multiplexed information in the state where the multiplexed information overlaps the object area or to embed multiplexed information in the state where the multiplexed information does not overlap the object area depending on the kind, size, and position of the object and the number of objects. Whether or not a user desires to embed multiplexed information in an object in an image in the state where the multiplexed information overlaps the object area is taken into consideration at the time of layout, and therefore, the load of a user is reduced.

Third Embodiment

In the first embodiment and the second embodiment, the processing to select multiplexed information and the processing to lay out the selected multiplexed information are automated. Because of this, an embedding-side user has no way to know what is selected as multiplexed information or where the selected multiplexed information is laid out. Consequently, in the present embodiment, by adding a step relating to manual adjustment processing in the flow in the embodiments described previously, information unexpected to an embedding-side user is prevented in advance from being selected or laid out.

Figure 18:
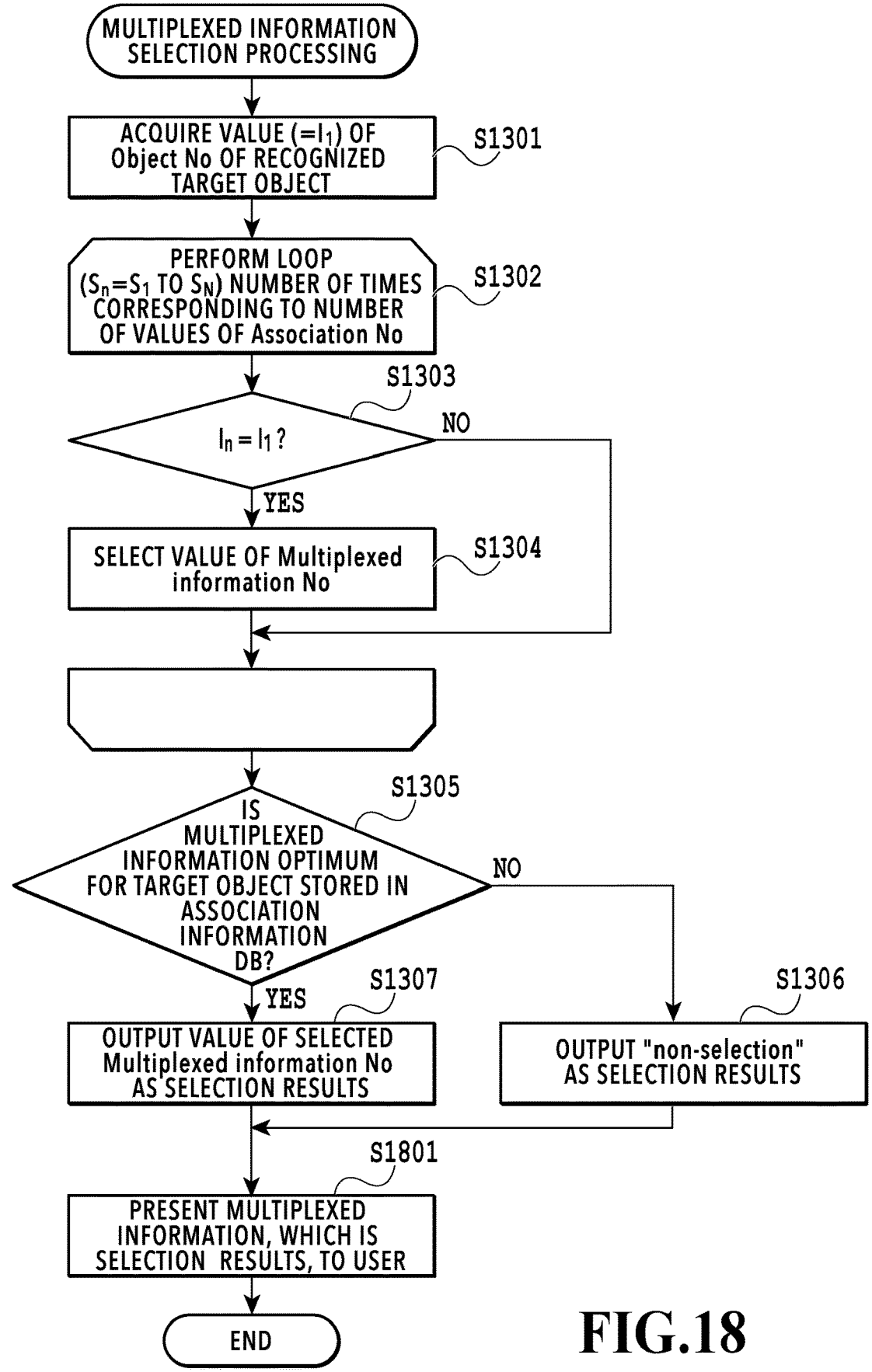
FIG. 18 is a flowchart of information selection processing in a third embodiment.

FIG. 18 is a flowchart of information selection processing in the present embodiment. Compared to the information selection processing in the second embodiment (see FIG. 17), it is known that additional processing (S1801) is provided. In the following, explanation of the contents that overlap those of the second embodiment is omitted.

At S1801, the information selection unit 307 presents the multiplexed information that is output as the selection results to a user. In detail, the information selection unit 307 displays the contents relating to the multiplexed information that is output as the selection results via a display device (specifically, a panel or the like) of the printing apparatus or the operation terminal. In a case where the information is inappropriate to a user, it is possible to abort the processing and perform the processing to select multiplexed information to be embedded again. Further, in a case where a plurality of multiplexed information candidates is output as the selection results, it is possible for a user to select the optimum multiplexed information from among the plurality of the presented multiplexed information candidates.

Figure 19:
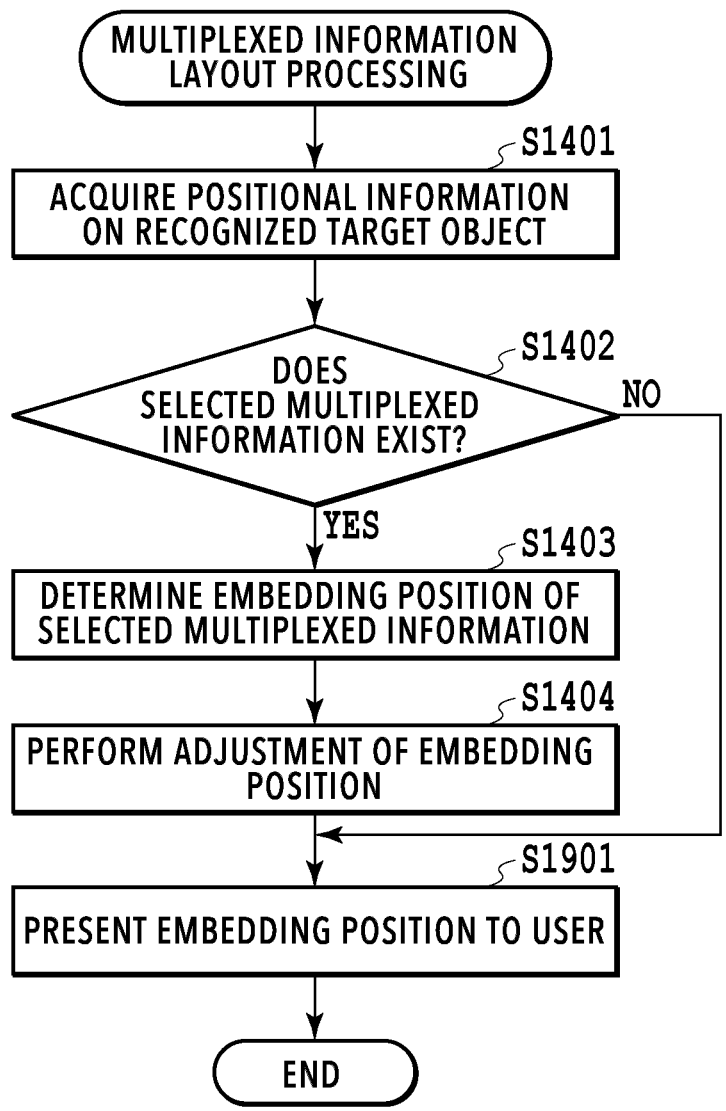
FIG. 19 is a flowchart of multiplexed information layout processing in the third embodiment.

FIG. 19 is a flowchart of multiplexed information layout processing in the present embodiment. Compared to the multiplexed information layout processing in the first embodiment (see FIG. 14), it is known that additional processing (S1901) is provided. In the following, explanation of the contents that overlap those of the first embodiment is omitted.

At S1901, the multiplexed information layout unit 310 presents embedding position information that is output as the layout results to a user. In detail, the multiplexed information layout unit 310 displays the contents relating to the embedding position information that is output as the layout results via a display device (specifically, a panel or the like) of the printing apparatus or the operation terminal. In a case where the embedding position is inappropriate to a user, it is possible for a user to abort the processing and perform fine adjustment of the embedding position or perform the processing to select the embedding position again. Further, in a case where a plurality of embedding position candidates is output, it is possible for a user to select the optimum embedding position from among the plurality of the presented embedding position candidates. For the presentation of the embedding position to a user, it is effective to display the embedding position in the state where the multiplexed information embedding area overlaps the object area as shown in FIG. 15A to FIG. 15C.

Effects of the Present Embodiment

In the present embodiment, a manual check step is provided to the multiplexed information automatic selection processing and the automatic layout processing. Due to this, it is made possible to securely embed the multiplexed information optimum for a user. Here, the manual step by a user is provided, and therefore, the load of a user increases compared to the embodiments described previously. However, in the present embodiment, the multiplexed information candidates and the embedding position candidates are presented, and therefore, the load of a user is reduced compared to the aspect in which a user is caused to select and embed multiplexed information from the entire DB without any presented candidates.

Fourth Embodiment

In the first embodiment and the second embodiment, Object No and the like are used as association information. Normally, association information is set manually, but it is also possible to set association information automatically.

For example, it is supposed that training data to be stored in the object DB 306 is acquired from a moving image. It is possible to extract a certain frame within a moving image and perform object recognition for the extracted frame. On the other hand, in a moving image, a voice is included, and therefore, it is possible to set a voice during several seconds before and after the frame as multiplexed information. In a case where object recognition is performed for a person captured in a frame, it is possible to associate the "person" information and the "voice" information at that time with each other. For information including the information indicating the kind of an object captured in an image and information that can be multiplexed in a set for a certain image as described above, it is possible to generate association information automatically. Information that can be multiplexed (voice in the present embodiment) is sometimes called information corresponding to additional information.

As another example, there is SNS information. In SNS, a photo and a comment are described at the same time. In a case where it is desired to embed a comment as multiplexed information, it is possible to associate with each other the information on the "person" captured in the photo and the contents of the "comment" at that time.

Effects of the Present Embodiment

According to the present embodiment, it is made possible to automatically set association information, and therefore, it is possible to reduce the load of a user compared to a case where setting is performed manually.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk such as a compact disc (CD), digital versatile disc (DVD), or Blu-ray Disc (BD)™), a flash memory device, a memory card, and the like.

According to one embodiment of the present invention, in a case where multiplexed information is embedded in an image, it is made possible to reduce the load of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-222001, filed Dec. 9, 2019, which is hereby incorporated by reference wherein in its entirety.

What is claimed is:

1. An image processing apparatus comprising:
    a recognition unit configured to recognize an object within an image;
    a selection unit configured to select additional information corresponding to an object recognized by the recognition unit from among additional information stored in a storage unit; and
    a layout unit configured to lay out the additional information so that at least a part of an area in which additional information selected by the selection unit is embedded overlaps an area of an object recognized by the recognition unit.

2. The image processing apparatus according to claim 1, wherein
    in the storage unit, association information for associating recognition results by the recognition unit and additional information with each other is stored.

3. The image processing apparatus according to claim 1, wherein
    in a case where additional information corresponding to an object recognized by the recognition unit is not stored in the storage unit, selection of additional information by the selection unit is not performed.

4. The image processing apparatus according to claim 1, wherein
    the selection unit selects the additional information based on recognition results of a kind of object by the recognition unit and information relating to the object other than information on the kind of object.

5. The image processing apparatus according to claim 4, wherein
    information relating to the object other than information on the kind of object includes at least one of a kind of object, a number of objects, an object size, and an object position.

6. The image processing apparatus according to claim 1, wherein
    in a case of laying out additional information in a plurality of areas, the layout unit adjusts a position at which additional information is laid out so that an overlap of additional information does not occur.

7. The image processing apparatus according to claim 1, further comprising:
    a presentation unit configured to present one or a plurality of additional information candidates corresponding to an object recognized by the recognition unit to a user, wherein
    the selection unit selects additional information in accordance with an input of the user.

8. The image processing apparatus according to claim 1, further comprising:
    a presentation unit configured to present results of being laid out by the layout unit to a user, wherein
    it is possible for the user to select again an additional information embedding position or perform adjustment manually.

9. The image processing apparatus according to claim 1, further comprising:
    a generation unit configured to automatically generate information to be stored in the storage unit based on information including an image, a kind of object, and information corresponding to the additional information in a set.

10. An image processing method comprising:
    recognizing an object within an image;
    selecting additional information corresponding to the recognized object from among additional information stored in a storage unit; and
    laying out the additional information so that at least a part of an area in which the selected additional information is embedded overlaps an area of the recognized object.

11. The image processing method according to claim 10, wherein
    association information for associating the recognized results and additional information with each other is stored.

12. The image processing method according to claim 10, wherein
    in a case where additional information corresponding to the recognized object is not stored, selection of the additional information is not performed.

13. The image processing method according to claim 10, wherein
    the additional information is selected based on recognition results of the kind of object and information relating to the object other than information on the kind of object.

14. The image processing method according to claim 13, wherein
    information relating to the object other than information on the kind of object includes at least one of a kind of object, a number of objects, an object size, and an object position.

15. The image processing method according to claim 10, wherein
in a case where additional information is laid out in a plurality of areas, a position at which additional information is laid out is adjusted so that an overlap of additional information does not occur.

16. The image processing method according to claim 10, further comprising:
presenting one or a plurality of additional information candidates corresponding to the recognized object to a user, wherein
additional information in accordance with an input of the user is selected.

17. The image processing method according to claim 10, further comprising:
presenting results of being laid out to a user, wherein
it is possible for the user to select again an additional information embedding position or perform adjustment manually.

18. The image processing method according to claim 10, further comprising:
automatically generating the information to be stored based on information including an image, a kind of object, and information corresponding to the additional information in a set.

19. A non-transitory computer readable storage medium storing a program for causing a computer to perform an image processing method comprising:
recognizing an object within an image;
selecting additional information corresponding to a recognized object from among additional information stored in a storage unit; and
laying out the additional information so that at least a part of an area in which selected additional information is embedded overlaps an area of a recognized object.

* * * * *